(12) United States Patent
Bravinski

(10) Patent No.: US 7,238,312 B2
(45) Date of Patent: Jul. 3, 2007

(54) METHOD AND APPARATUS FOR FORMING APERTURES IN FOAMED POLYSTYRENE AND OTHER FOAMED PLASTIC PANELS

(76) Inventor: Leonid G. Bravinski, 5418 Yonge Street, Unit 2606, Toronto, Ontario (CA) M2N 6X4

( * ) Notice: Subject to any disclaimer, the term of this patent is extended or adjusted under 35 U.S.C. 154(b) by 226 days.

(21) Appl. No.: 10/307,855

(22) Filed: Dec. 2, 2002

(65) Prior Publication Data

US 2004/0104504 A1 Jun. 3, 2004

(51) Int. Cl.
*B28B 11/12* (2006.01)
*B28B 17/04* (2006.01)
*E04G 11/06* (2006.01)
*E04G 17/14* (2006.01)

(52) U.S. Cl. ............... 264/154; 264/155; 264/138; 425/290

(58) Field of Classification Search ............... 264/219, 264/138, 154, 400, 404, 155; 425/290
See application file for complete search history.

(56) References Cited

U.S. PATENT DOCUMENTS

| | | | | |
|---|---|---|---|---|
| 1,478,319 A | * | 12/1923 | Young | 219/240 |
| 1,497,628 A | * | 6/1924 | Young | 219/541 |
| 1,513,713 A | * | 10/1924 | McCullough | 219/481 |
| 1,533,230 A | * | 4/1925 | Colby | 219/238 |
| 1,584,318 A | * | 5/1926 | Morgan | 219/229 |
| 1,617,033 A | | 2/1927 | Shields | |
| 1,701,858 A | * | 2/1929 | Lamb | 219/533 |
| 2,359,393 A | * | 10/1944 | Sloan | 219/233 |
| 3,038,198 A | * | 6/1962 | Schaar | 425/290 |
| 3,384,696 A | * | 5/1968 | Makansi | 264/321 |
| 3,594,261 A | * | 7/1971 | Broerman | 428/85 |
| 3,694,626 A | * | 9/1972 | Harnden, Jr. | 219/541 |
| 3,805,649 A | | 4/1974 | Hester | |
| 4,063,065 A | | 12/1977 | Wust | |
| 4,326,909 A | | 4/1982 | Slavik | |
| 4,393,635 A | | 7/1983 | Long | |
| 4,462,194 A | * | 7/1984 | Wahner | 52/309.11 |
| 4,552,600 A | | 11/1985 | Laiewski et al. | |
| 4,747,895 A | | 5/1988 | Wallerstein et al. | |
| 4,805,366 A | | 2/1989 | Long | |
| 4,967,528 A | | 11/1990 | Doran | |
| 5,066,531 A | * | 11/1991 | Legg et al. | 428/131 |
| 5,347,900 A | * | 9/1994 | Ceaser et al. | 83/171 |
| 5,350,162 A | | 9/1994 | Cushing | |
| 5,658,483 A | | 8/1997 | Boeshart | |

(Continued)

*Primary Examiner*—Christina Johnson
*Assistant Examiner*—Matthew J. Daniels
(74) *Attorney, Agent, or Firm*—Smart & Biggar; Alistair G. Simpson

(57) ABSTRACT

An apparatus is adapted to form a plurality of apertures in a panel made from a meltable foamed plastic material. The apparatus has a movable panel support device for supporting said panel and a heating array. The heating array has a plurality of heating elements mounted to a support frame. The heating array is disposed opposite to the panel support device. Each of the heating elements is adapted to emit sufficient heat to melt the foamed plastic material when a panel is positioned proximate the heating elements. A driving mechanism is provided for moving the panel support device toward and away from said plurality of heating elements. The panel supporting device moves a panel supported thereon, towards and away from the plurality of heating elements and during them movement melts a plurality of apertures in the panel.

42 Claims, 24 Drawing Sheets

U.S. PATENT DOCUMENTS

| | | |
|---|---|---|
| 5,771,648 A | 6/1998 | Miller et al. |
| 5,809,725 A | 9/1998 | Cretti |
| 5,857,293 A | 1/1999 | Redjvani |
| 5,887,401 A | 3/1999 | Moore, Jr. |
| 5,935,681 A * | 8/1999 | Paulett .................. 428/137 |
| 6,318,040 B1 | 11/2001 | Moore, Jr. |
| 6,321,498 B1 | 11/2001 | Trovato |
| 6,360,505 B1 | 3/2002 | Johns |
| 6,405,505 B1 | 6/2002 | Alberti |
| 6,612,083 B1 | 9/2003 | Richards |
| 2001/0020351 A1 | 9/2001 | Alvaro |

* cited by examiner

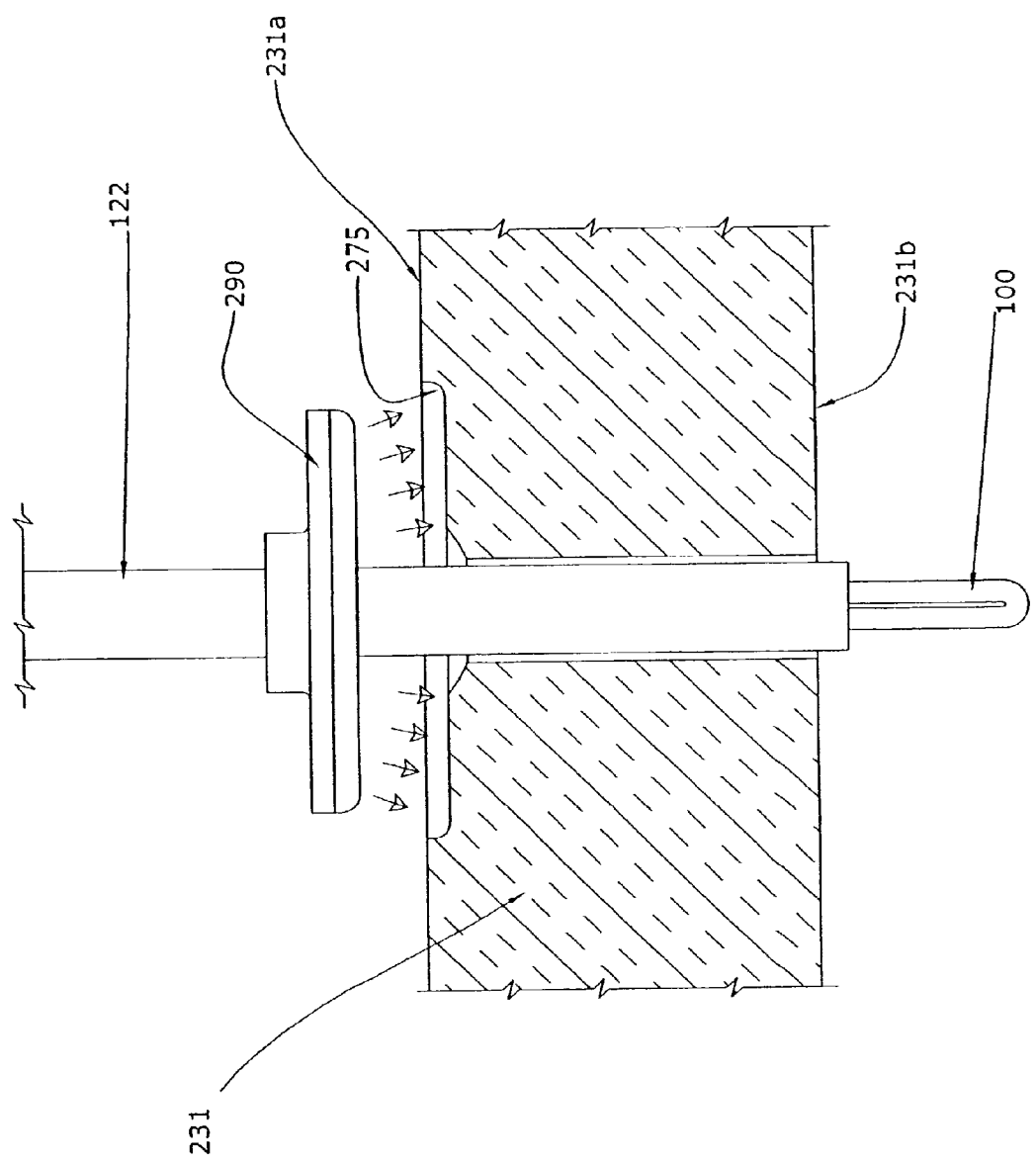

METHOD AND APPARATUS FOR FORMING APERTURES IN FOAMED POLYSTYRENE AND OTHER FOAMED PLASTIC PANELS

TECHNICAL FIELD

The present invention relates to methods and apparatus for forming apertures in foamed polystyrene, and other foamed plastic panels.

BACKGROUND OF THE INVENTION

Concrete walls and other concrete structures, are typically made by building a form. Unhardened concrete is poured into the form space provided by the form. Once the concrete hardens, the form walls can be removed. In some cases the form walls can remain in place after the structure has been made, and can for example serve an additional purpose such as providing insulation.

It is known to make the form walls from a series of interconnected panels. It is also known to use foamed plastic materials, including foamed polystyrene, for such panels.

Typically, the panels are held in place to provide the form when the concrete is poured in the form space, by providing tie-rods that stretch between two spaced panels. Typically the rods pass from an inner surface of the panels and join with some kind of end connector.

With reference to United States patent application publication no. 2002/0092253 published Jul. 18, 2002, a method is described whereby an anchor member is embedded in a foam panel. During the formation of the foam panel, the panel is injection formed so as to surround the anchor member. This may create a relatively strong connection between the panel and the anchor member. Despite the obvious advantages of such a connection, manufacturing of such plastic panels requires special molding equipment, which allows panels to be formed with installed anchor members. Such equipment and associated methods are expensive and don't allow the use of a common foam panel produced by industry for wall and roof thermal insulation. In some foamed panel applications for formwork, it is not desirable that the anchor member be fixed relative into the panel during the forming process. In particular, in some applications, it is desirable that the anchor member or connector be free to rotate relative to the panel so it can be secured firmly to an end of a tie-rod.

The building of forms using such foam plastic panels is assisted by the availability of numerous apertures in order to receive corresponding tie-rods and/or connectors.

It should be noted that known methods of forming apertures, such as milling, are not effective for forming apertures in foam plastic due to its low strength. Additionally, apertures formed with mechanical impacting on foam plastic, is very complicated to control because of the coarse structure of foam plastic.

U.S. PTO application Ser. No. 10/253,843 filed on Sep. 24, 2002 by the same applicant, the contents of which, are hereby incorporated by reference, discloses a method and a design for apparatus for forming apertures in foamed plastic panels. The method and apparatus include a carriage mounted on tracks to travel on the frame. The carriage is adapted to hold the panels and there is a mechanism mounted above the panel to move the aperture forming instruments towards the panel. The aperture forming instruments consist of a longitudinal tubular probe heated by an electrical resistance coil with no contact with the panel and cause apertures to be formed there through. The coil is heated by electrical current, using transformers.

However, this apparatus has a relatively low production output if a large number of apertures are required for the panel that will be used in the form. The design of the instrument results in a relatively unheated ("cold") end. To heat the end portion of the instrument to generate a suitably hot thermal field under the instrument's end, the amount of heating of the main body of the instrument must be significantly increased. However, in heating the end for non-contact entering into a panel made of a foamed plastic material, the heat in the body is so high that it is difficult to form commensurable apertures with a diameter just a small amount larger than the diameter of the instrument. Additionally, this instrument doesn't allow forming the aperture with a complicated shape. Also, because the instrument is moving toward and through the panel, it becomes colder under the airflow movement and this causes a disruption to the thermal field around the heating instrument. This results in a decrease in temperature of the thermal field, which leads to a need to increase the consumed electrical power volume, to provide a given temperature and thermal field. In addition, use of the transformers as the electricity source for coils increases the cost of such a machine.

Accordingly, it is desirable to provide an improved method and apparatus for efficiently providing a plurality of apertures in foam plastic panels, particularly of the type that are used for construction.

SUMMARY OF INVENTION

According to one aspect of the present invention, there is provided an apparatus for forming a plurality of apertures in a panel made from a meltable foamed plastic material. The panel has first and second opposed surfaces defining a panel body there between. The apparatus comprises: (a) a movable panel supporting device for supporting the panel; (b) a heating array comprised of a plurality of heating elements mounted to a support frame. The heating array is disposed opposite to the panel supporting device and each of the heating elements is adapted to emit sufficient heat to melt the plastic material when a panel is positioned proximate the heating elements. A driving mechanism is provided for moving the panel supporting device toward and away from the plurality of heating elements. The driving apparatus is used to move the panel supporting device and a panel supported thereon, towards and away from the plurality of heating elements. The plurality of heating elements are positioned opposite and proximate the first surface of the panel held by the supporting device. This allows for the panel to be moved by the supporting device to a position proximate the plurality of heating elements enabling the heating elements to melt a plurality of apertures in the panel at the first surface of the panel.

According to another aspect of the present invention, there is provided a method of forming a plurality of apertures in a panel made from a meltable foamed plastic material. The panel has first and second opposed surfaces defining a panel body there between. The method comprises the step of moving the panel toward a plurality of heat elements in a first direction so that the first surface of the panel is heated by the plurality of heating elements to melt the plastic material at a plurality of locations.

According to another aspect of the present invention, there is provided a heating apparatus that comprises an outer tube having a hollow interior cavity and a first end and a second end. The first end has a hot tip. The apparatus also has a high resistance element extending in the cavity from proximate the first end to proximate the second end. The high resistance element is connected to a source for electricity to pass an electric current through the high resistance element to thereby generate heat capable of melting a plastic material when the plastic material is proximate the heating element. Also there is a heating disc mounted to the outer tube at a distance from the first end. The heating disc is adapted to generate heat capable of melting

BRIEF DESCRIPTION OF THE DRAWINGS

In drawings that illustrate by way of example only, preferred embodiments of the present invention:

FIG. 10a is a cross sectional view of a secondary disk heating element used in the heating cartridge of FIG. 9a;

FIG. 11a is one example of a shaped aperture formed in a polystyrene panel by the machine of FIG. 1 with a mounted heating cartridge in FIG. 9 or 9a;

FIG. 11b is another example of a shaped aperture formed in a polystyrene panel by the machine of FIG. 1 with a mounted heating cartridge in FIG. 9 or 9a;

FIG. 11c is a third example of a shaped hole formed in a polystyrene panel by the machine of FIG. 1 with a mounted heating cartridge in FIG. 9a;

FIG. 12a shows the initial step of one aperture forming in a foamed plastic panel by the machine of FIG. 1 with a mounted heating cartridge in FIG. 9 or 9a;

FIG. 12b shows the intermediate step of one aperture forming in a foamed plastic panel by the machine of FIG. 1 with a mounted heating cartridge in FIG. 9 or 9a;

FIG. 12c shows the final step of one aperture forming in a foamed plastic panel by the machine of FIG. 1 with a mounted heating cartridge in FIG. 9a;

DETAILED DESCRIPTION

Figure 1:
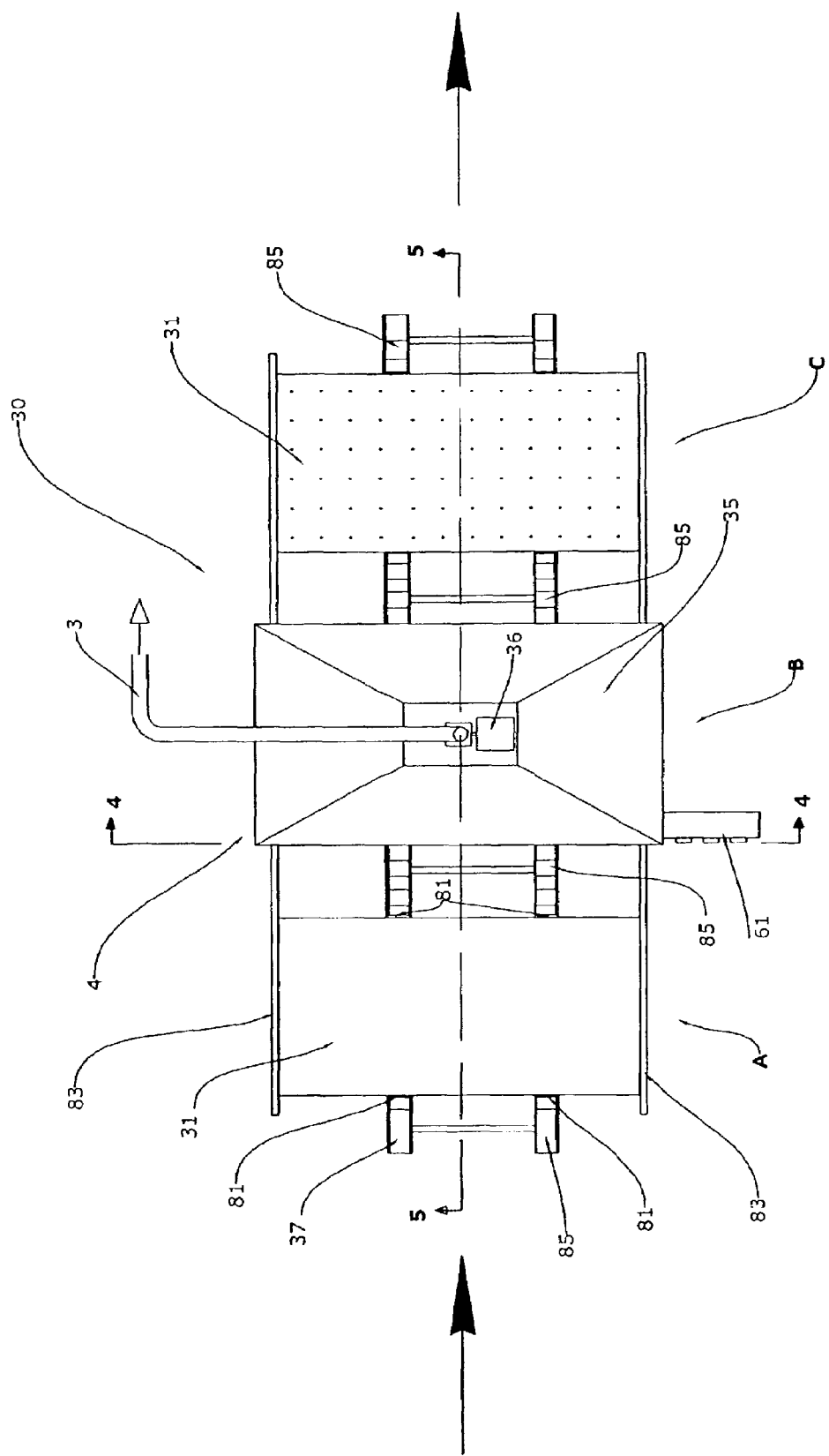
FIG. 1 is a plan view of a machine in accordance with an embodiment of the invention.

With reference first to FIGS. 1, 2, 3, 4 and 5 a machine 30 for providing a plurality of apertures in a foamed plastic panel 31 is illustrated. Machine 30 can be adapted for use with a variety of foamed plastic panels, including expanded polystyrene panels (eg. grade EPS ASTM C 578-00 Type 1X) and extruded polystyrene panels (eg. grade XPS ATM C 578-00 Type VI). Panels 31 are typically in the range of approximately 2-20 cm in thickness, but can be larger and smaller in thickness.

Machine 30 includes a frame generally designed 39, a lift table 41 movable relative to the frame, and a heating array generally designated 63 positioned above the lift table and immovably fixed to the frame 39. Machine 30 also has a ventilation system generally designated 51, a control system 61 and a transport conveyor system 37.

Figure 14:
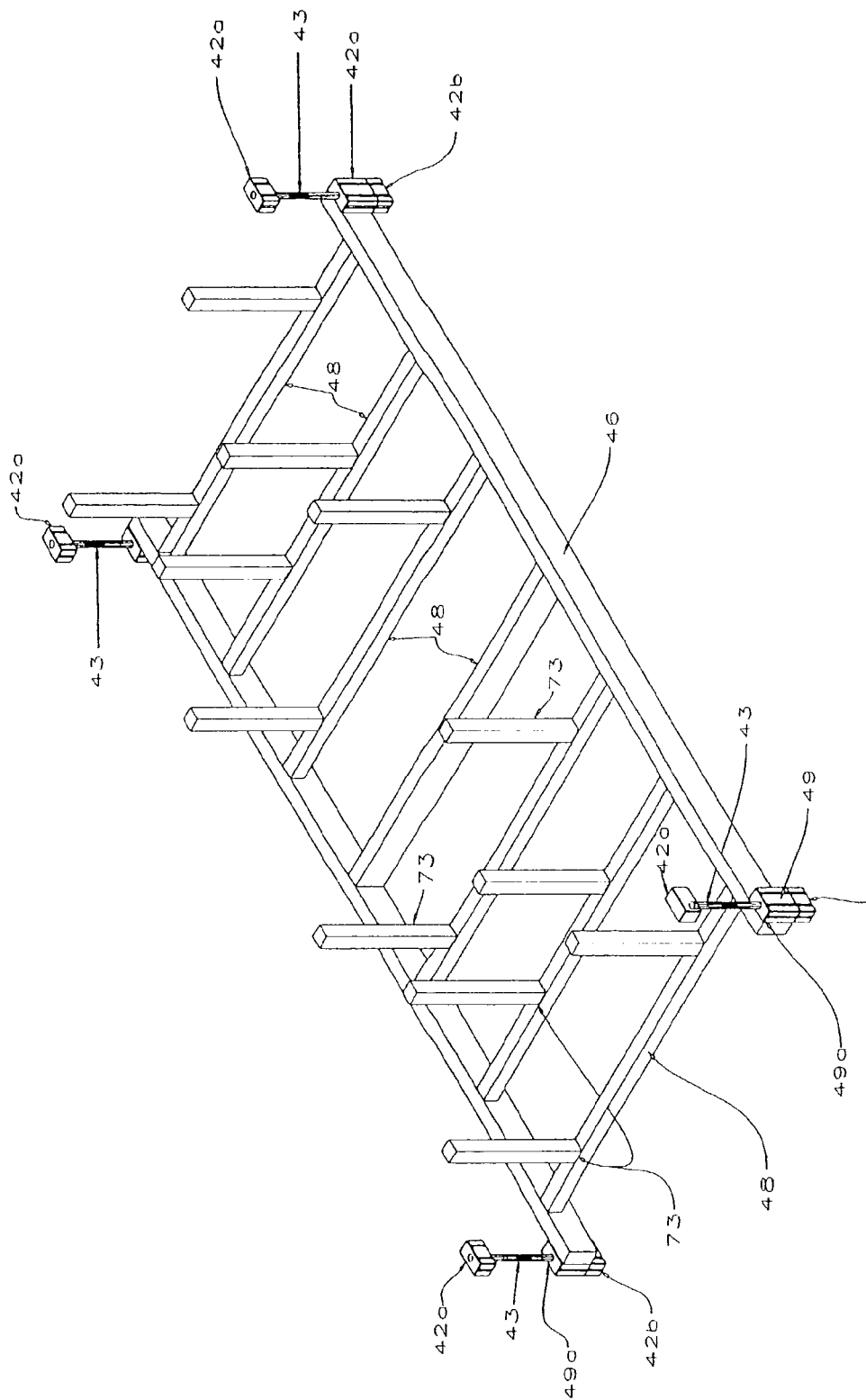
FIG. 14 is a perspective view of the lifting table which is another part of the machine of FIG. 1.
Figure 16:
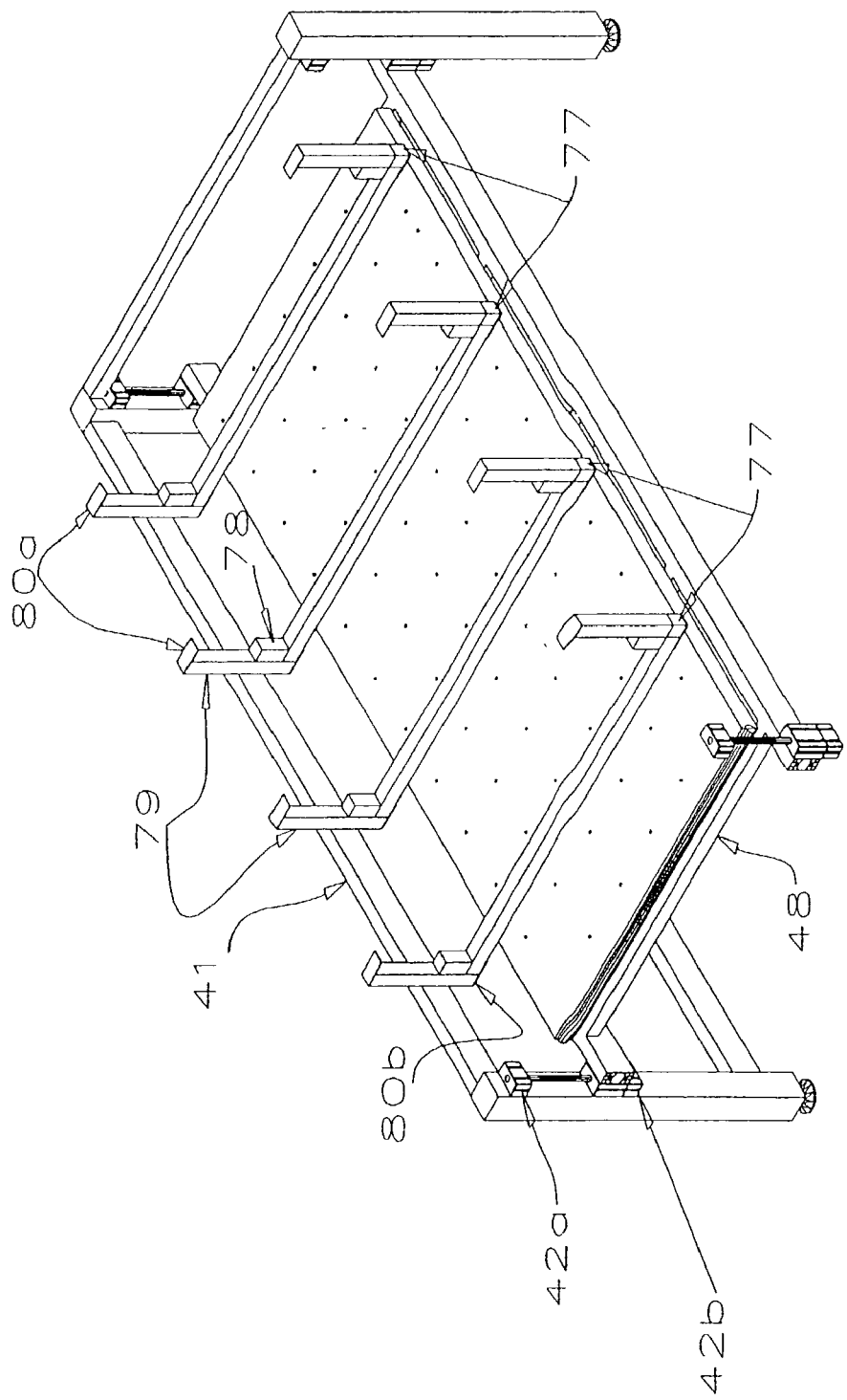
FIG. 16 is a perspective view showing a panel stripper forming another part of the machine of FIG. 1.

As best shown in FIGS. 14 and 16, lift table 41 is generally formed from longitudinal beam members 46 interconnected with a series of transverse members 48. Mounted at the four outer corners of lift table are bushing and block members 49. A bushing 49a in block 49 is configured to receive a guide rail 43. Bushing 49a and block 49 can thus slide up and down along guide rail 43. An upper end of each guide rail 43 is affixed to a mounting block 42a, which is mounted to frame 39. Likewise, a lower end of each guide rail 43 is affixed to a mounting block 42b, which is mounted to a lower part of frame 39. Thus, lift table 41 is mounted for vertical movement relative to frame 39, such movement restricted on guide rail 43 within the limits imposed by the abutment of block 49 with blocks 42a and 42b. Various different configurations for lift table 41 are of course possible. By way of example only, lift table 41 in said machine 30 can be configured as a scissors lift table.

Also, as shown in FIG. 16, a panel stripper apparatus includes a plurality of transversely and horizontally mounted stripper bars 77 secured to vertical bars 78. The vertical bars 78 have guides, which slide along vertical tracks or slots (not shown) in vertical bars 79. Bars 79 are fixedly mounted to the frame 39 and have vertical movement stoppers 80 that restrict the vertical movement of bars 78 in the guides and thus the vertical movement of bars 77. The stripper bars 77 and 78 are configured so that they can move vertically upward accompanying, and lifted by, the upward motion of lift table 41. This lifting movement will preferably commence after the panel has already been lifted free of transport conveyor 37, but before the panel comes into the vicinity any significant degree of heat generated by the thermal field from the heating array 63. The upward movement of bars 77 however can continue as the heating elements penetrate the body of the panel. Once the apertures have been formed, the lift table 41 will move downward. During this movement of lift table 41, bars 77 will likewise move down from their own weight, and apply a downward force on an upper surface of panel 31, preferably until panel 31 has cleared the heating elements and most preferably exited the thermal field. This results in preventing the panels from staying in a position between the heating cartridges. Other devices or apparatus can be employed in machine 30 to provide a stripping mechanism for the panel. For example, a loose chain (possibly weighted) connected to frame 39 at two ends, can be employed that rests upon the top of the panel when lifted to heating array. When the lift table is lowered, it can apply a downward force onto panel 31.

Figure 4:
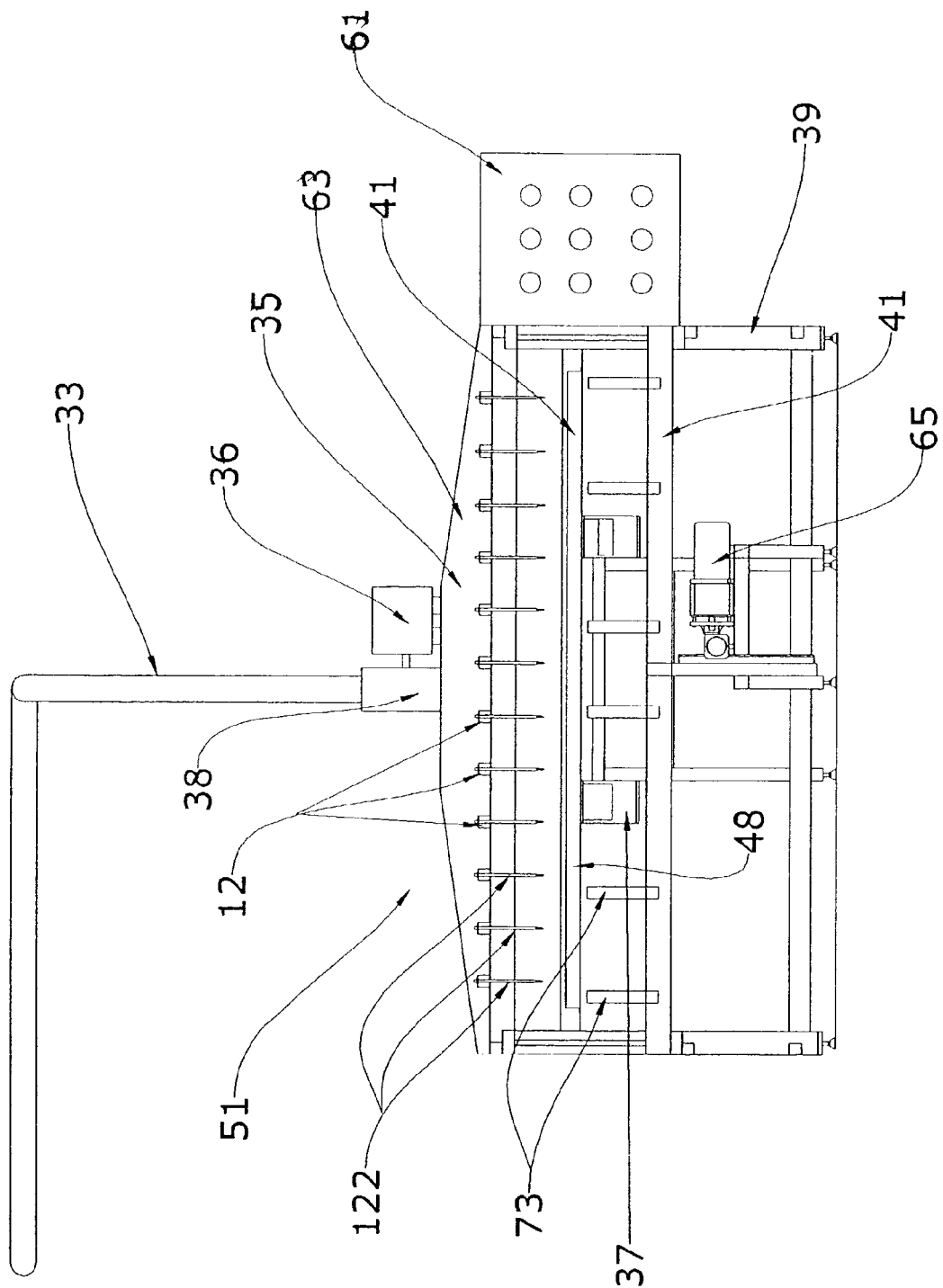
FIG. 4 is a cross sectional view at 4-4 in FIG. 1.
Figure 5:
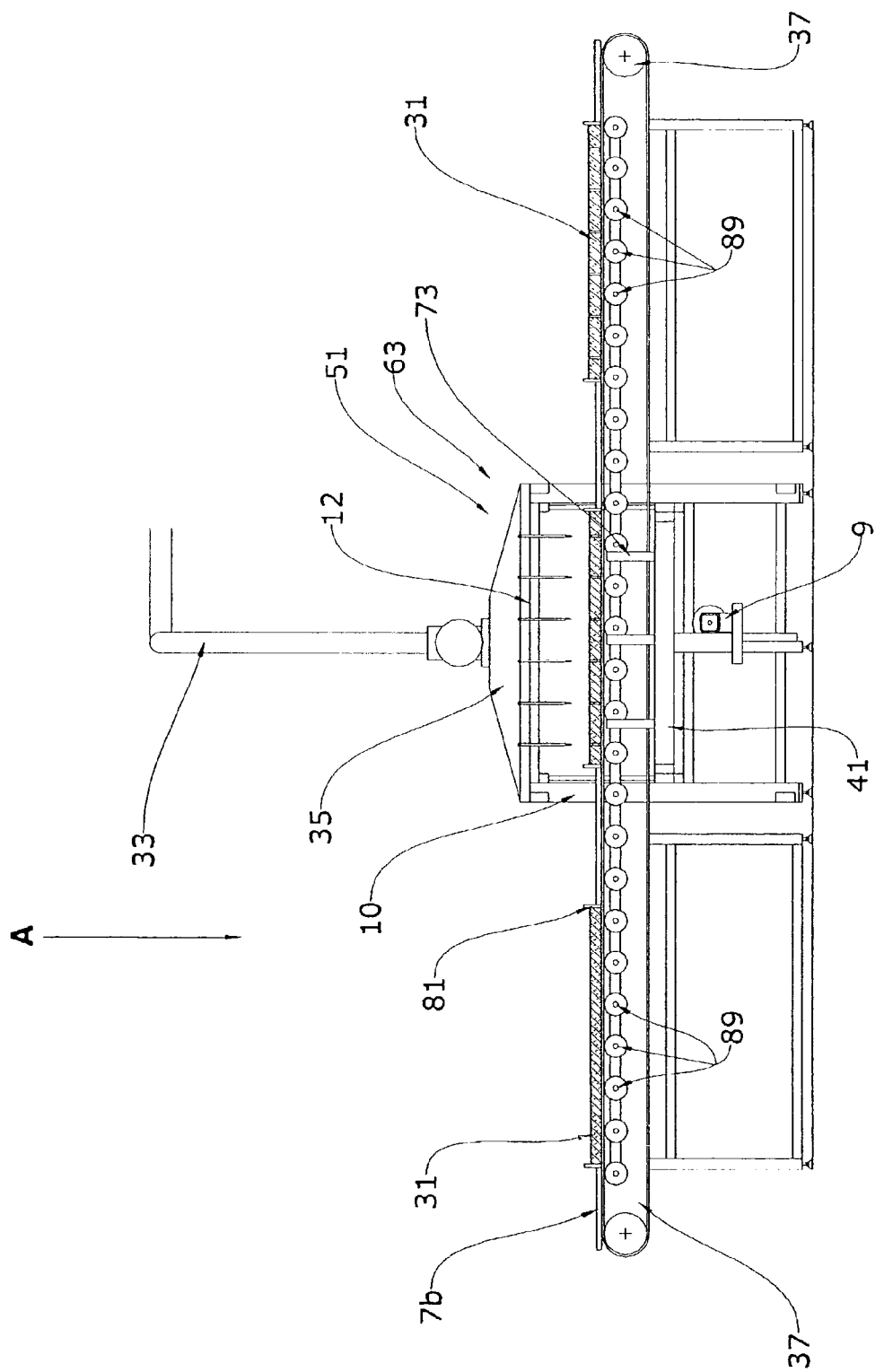
FIG. 5 is a cross sectional view at 5-5 in FIG. 1.

Returning to the construction and operation of lift table 41, as shown in FIG. 4, lift table 41 also has a plurality of upstanding pusher members 73 which, as will be explained in detail hereinafter, are used to lift a panel 31 towards the heating array 63 in order to create the apertures in the panel. A plurality of pusher members 73 are mounted to each of transverse members 48 of table 41 (not shown in FIG. 14). As is illustrated in FIG. 5, transverse members 48 of lift table 41 are positioned vertically below the belts 85 of conveyor 37, and pusher members 73 extend between the belts. Thus, if a panel 31 is positioned on belts 85, upward movement of pushers 73 will cause the panel to be raised upwards from belts 85, toward heating array 63.

Table 41 is vertically raised and lowered relative to heating array 63 and frame 39 by a table drive system generally designated 65. Table drive 65 can, for example, comprise a DC elective drive motor interconnected to a typical gear mechanism, which translates the rotary movement of the drive motor into vertical upward and downward motion of the table. Other suitable linear drive mechanisms, which can be suitably controlled and drive lift table 41 up and down, can be used.

Figure 13:
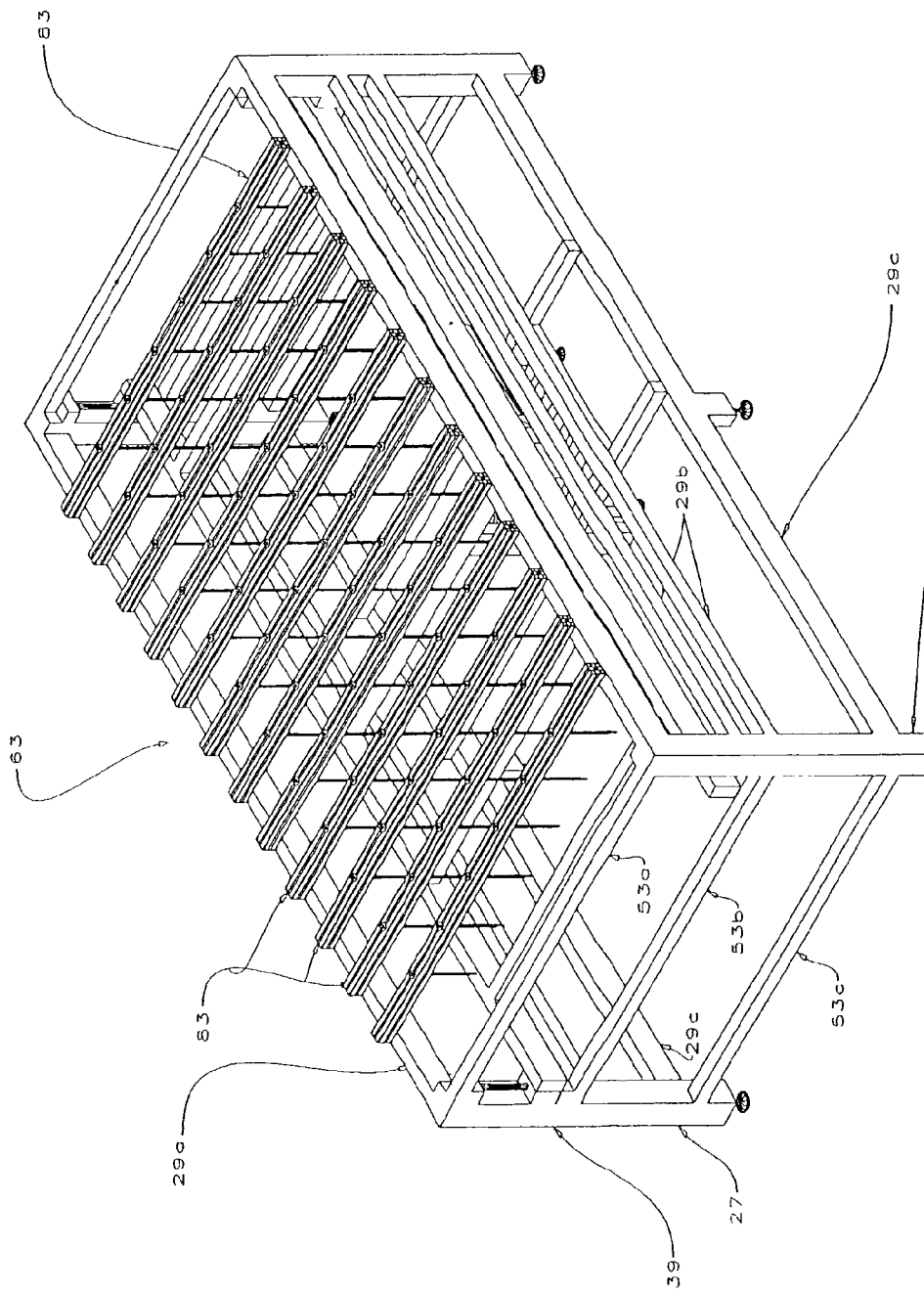
FIG. 13 is a perspective view of the frame and heating elements of the machine of FIG. 1.

With reference to FIG. 13, frame 39 generally includes a series of pairs of longitudinal beams, 29a, 29b and 29c each pair being interconnected at its ends to an end of a transverse member, namely transverse members 53a, 53b, and 53c respectively. Each combination of longitudinal beams and transverse members 29a, 53a; 29b, 53b; and 29c, 53c is attached to four columns 27. Thus a frame 39 is formed and serves to support the lift table 41 for vertical movement in relation thereto. Frame 39 also supports heating array 63 having a plurality of heating cartridges 122, from top beams 29a.

Figure 15:
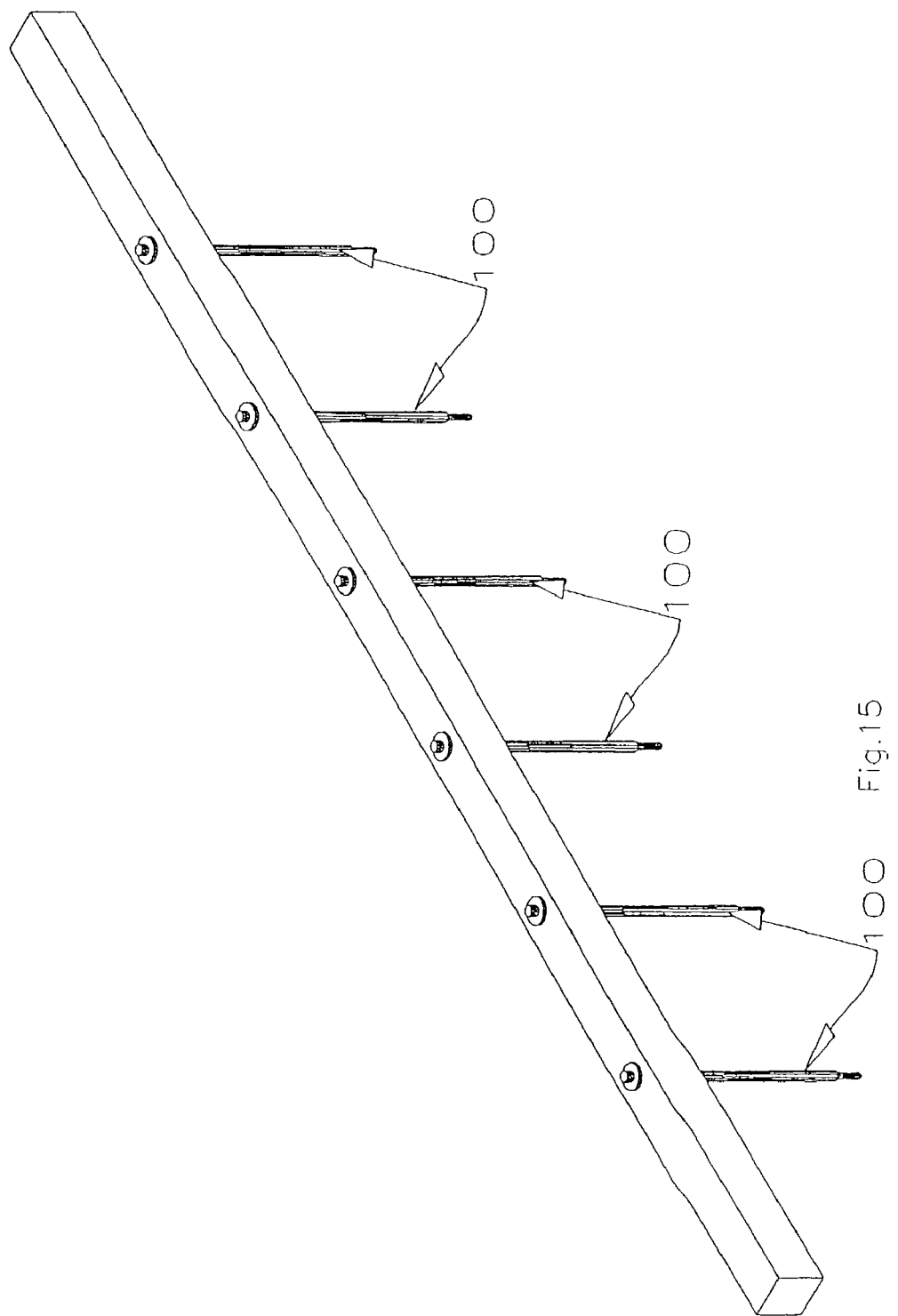
FIG. 15 is an isolated view of several heating elements mounted to a supporting beam in the machine of FIG. 1.

With reference to FIGS. 13 and 15, heating array 63 comprises a plurality of transversely mounted heat array support beams 83, secured at each end to a longitudinal beam 29a. Secured to, and depending down from, each heat array support beam 83 are a plurality of heating cartridges 122, which are described in detail hereinafter.

In this preferred embodiment, the heating array 63 is fixed in space. It will however be appreciated that in some embodiments, the heating array 63 might be capable of a small amount of movement, without substantially disrupting the thermal field around the heating cartridges 122. Nevertheless, most of the movement between heating array 63 and the panel support apparatus that takes place relative to the surrounding environment, is movement by the panel support apparatus.

Figure 2:
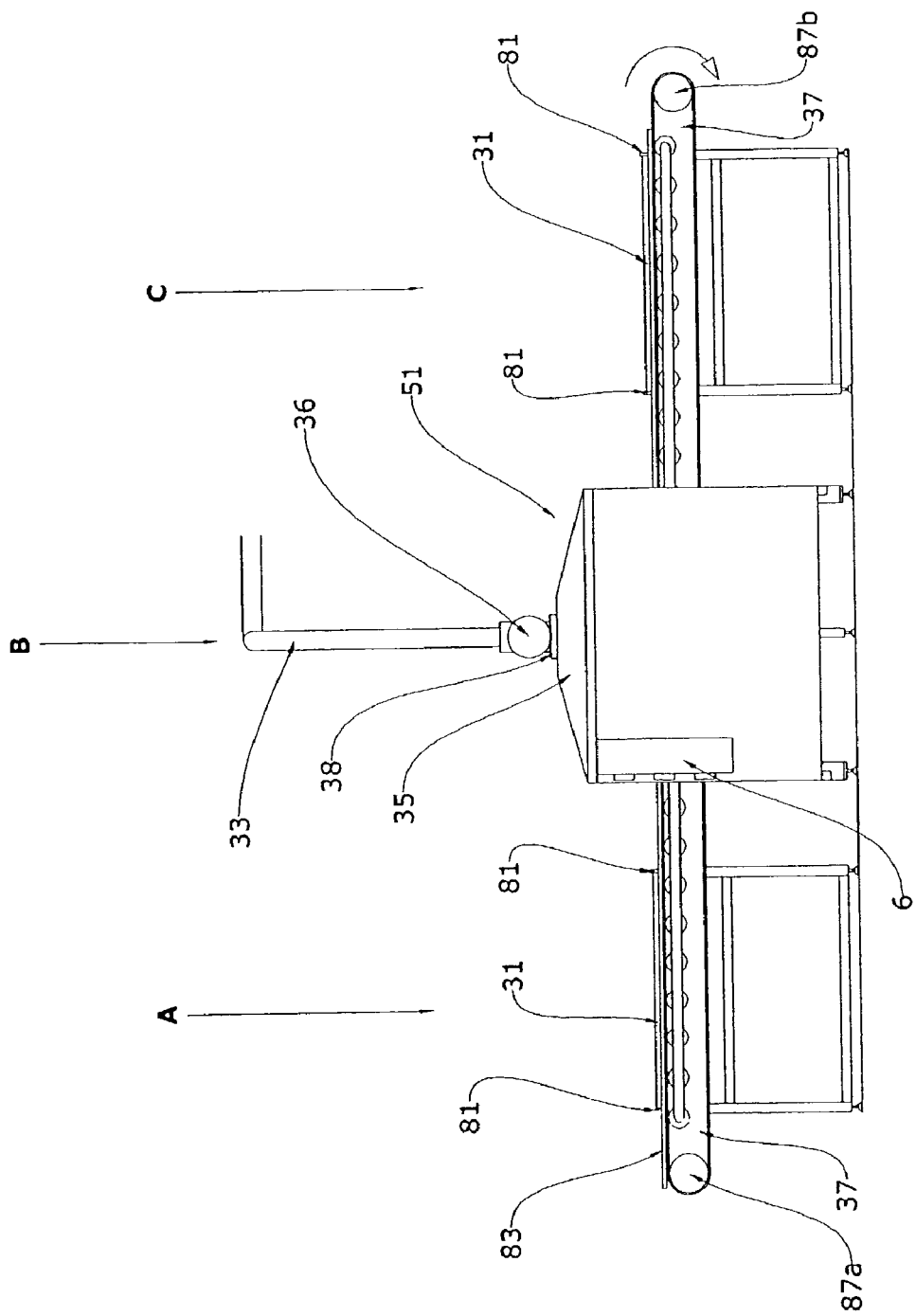
FIG. 2 is a side elevation view of the machine of FIG. 1.
Figure 3:
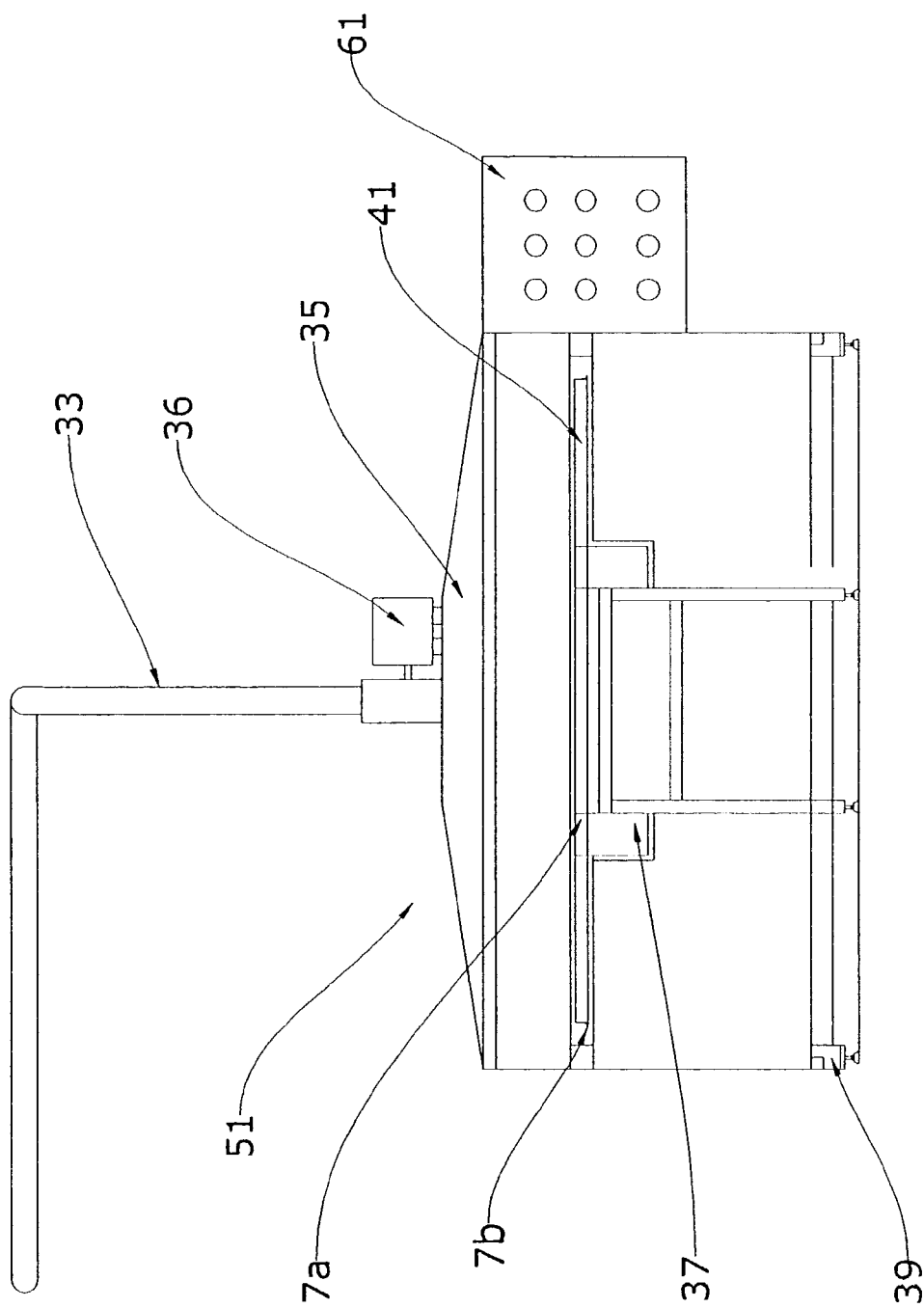
FIG. 3 is a front elevation view of the machine of FIG. 1.

With reference to FIGS. 1 and 2, transport conveyor 37 is configured to be able to transport panels 31 from a loading station A, to an aperture forming station B, to an unloading station. Conveyor 37 comprises a pair of spaced apart continuous conveyor belts 85 driven around spaced drive wheels 87a, 87b which can be powered by conventional drive mechanisms. A plurality of freely rotating rollers 89, affixed to frame 39, are provided to support the belts 85 as they move from station A, to station B and finally to station C. Conveyor belts 85 are configured so as to be able to support thereon one or more panels 31 through stations A, B and C. Mounted at a leading position and trailing position on each belt 85, are movable guide members or flights 81, which guide the transverse edges of panels 31. It will be appreciated that several sets of guides will be provided on belts 85. Mounted longitudinally on frame 39 are also fixed guides 83 which serve to guide the longitudinal edges of panels 31. Thus, each panel 31 is guided in its movement by a leading guides 81 and a trailing pair of guides 81, such that each panel 31 will move with belts 85 and generally maintain its orientation. The guides 81 joined to the transport conveyer belt are used to fix the position said panels 31 in the loading position, lifting and lowering positions and the unloading position. Usually guides 81 are simply L-shaped metal profiles.

Ventilation system 51 includes a hood 35 with a centrally positioned opening 38 in communication with an exhaust duct 33. A fan (not shown) is driven by a fan motor 36. The exhaust fan is disposed at the opening 38 of hood 35 and is configured to be able to draw up into the exhaust duct 33, air, noxious gases and other fine particle materials which it is desired to remove from the vicinity of the machine 30, and which results from the operation of the machine, as described hereafter.

Heating array 63 includes a plurality of heating cartridges 122, and in a preferred embodiment, there are a total of 72 cartridges arranged in longitudinally and transversely spaced orientation to provide a rectangular grid. The effect of employing machine 30 to a panel 31, is to create a grid of apertures in a pattern shown at station C in FIG. 1. Of course, the specific arrangement of the heating cartridges in the heating array 63 can be modified to provide for any particular grid pattern that is required.

Figure 6:
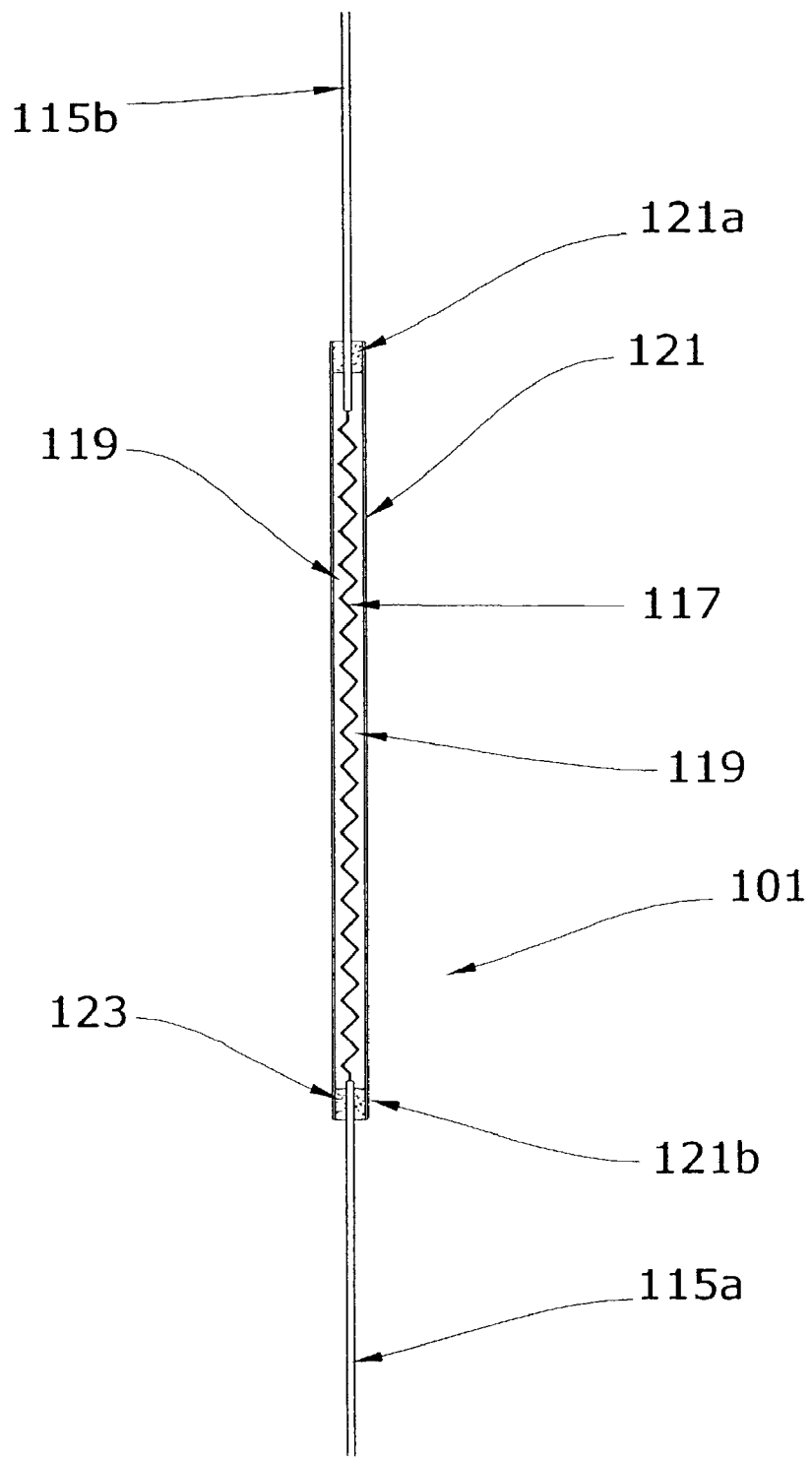
FIG. 6 is a cross sectional view through a pre-form for an example of a heating element used to form part of a heating cartridge used in the machine of FIG. 1.

With reference to FIG. 6, a pre-form 101 component for one of several of the preferred heating elements 100 (See FIG. 9a) employed in an example of a heating cartridge 122 used in heating array 63 is illustrated. Pre-form 101 includes a spiral wire 117 made from a material with a long-life durability and thermal stability having high electrical resistance such as Nichrome (nickel chromium alloy). Wire 117 has attached to each end a connector wire 115a, 115b which is a wire having much less resistance to permit electric current to be delivered to wire 117. Wires 115a, 115b would typically be made of a material like copper with typical electrical resistivity in the order of 1.7 µOhms×cm. By comparison, wires 117 would typically have an electrical resistivity of in the range of 100-110 µOhms×cm.

The inner wall of tube 121 is also insulated with powdered ceramic material or other suitable insulator to ensure there is no short circuit between wire 117 and the inner wall of tube 121. Wire 117 is thus held in inner cavity 119 of hollow steel tube 121 in an insulated state. Except for permitting the passage of wires 115a and 115b to extend from the ends of the tube 121, the inner cavity is sealed at both ends 121a and 121b with a stopper 133 made with an insulating material such as a suitable ceramic material 123. Wires 115a, 115b pass through apertures in stoppers 123 and are interconnected to a suitable source of electricity of a suitable voltage to provide the desired current and consequent heating. It is not necessary that the cavity 119 be air tight due to the fact that the tube is made from heat-resistant material.

To provide the apertures that are formed substantially commensurate with the diameter of the heating cartridge, a uniform temperature field is required around the heating cartridge tip.

Figure 7:
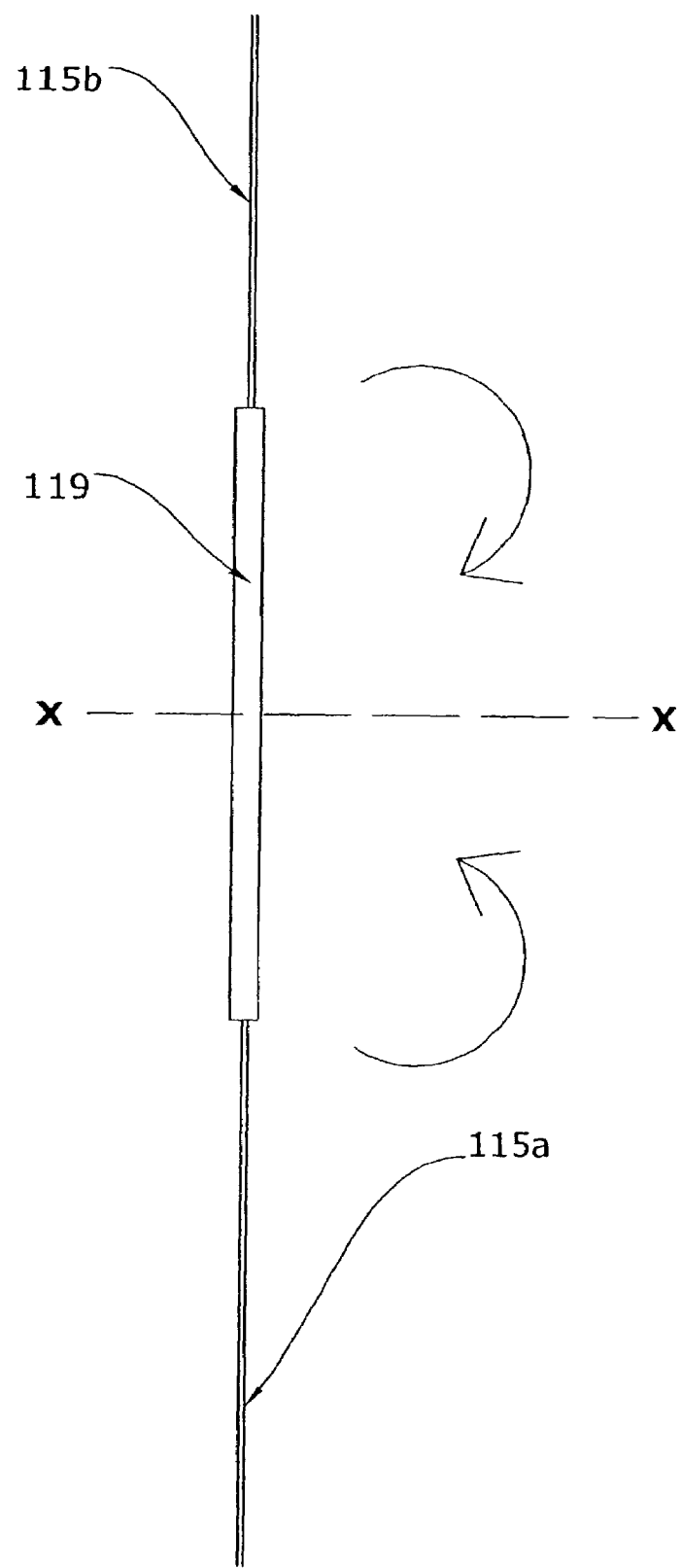
FIG. 7 is a schematic view showing the bending operation carried out on the pre-form of FIG. 6.
Figure 8:
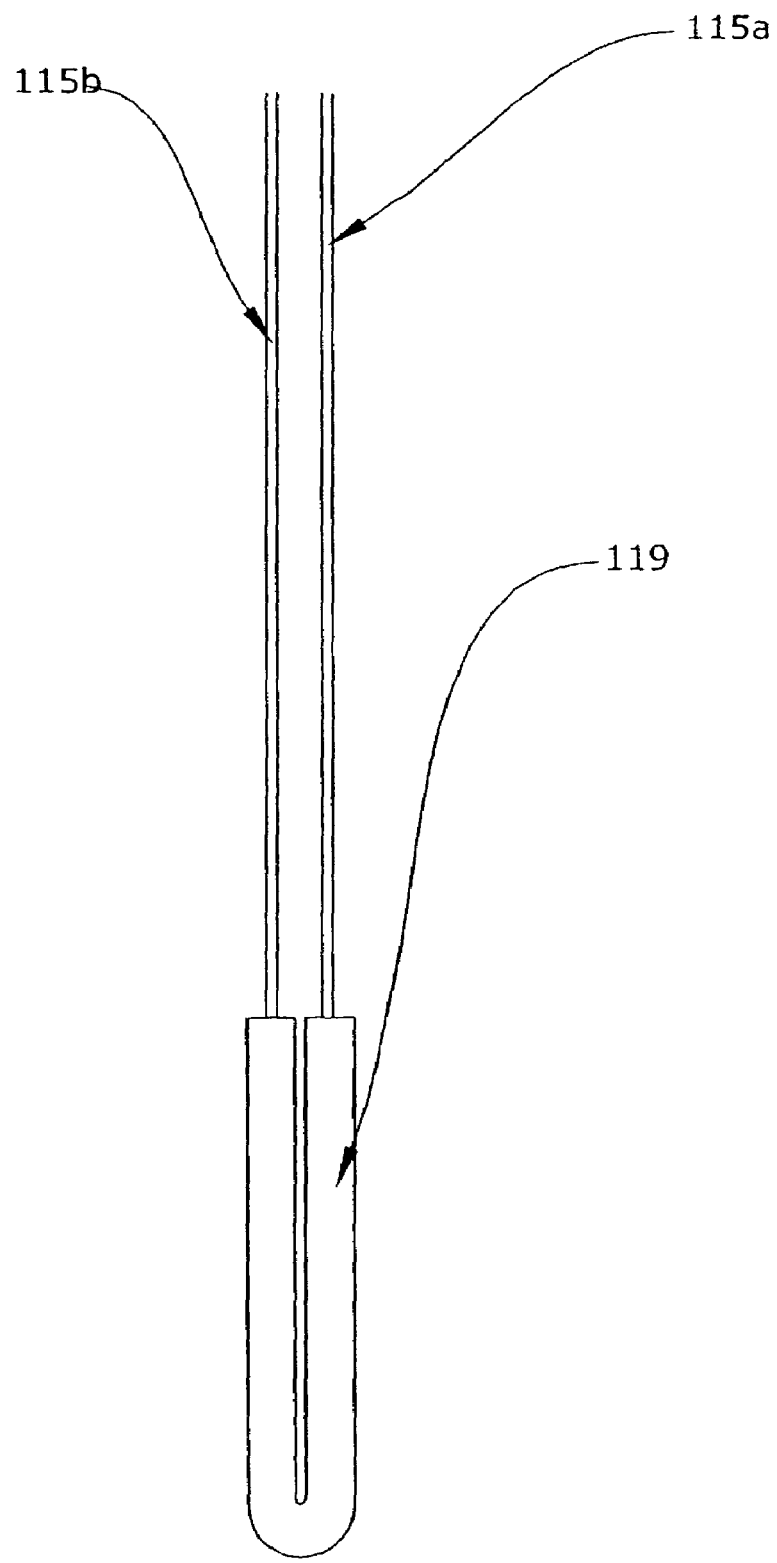
FIG. 8 is a schematic view showing the shape of the heating element after the bending operation of FIG. 7 has been carried out on the pre-form of FIG. 6.

To make the heating element 100 with a hot tip used in the heating array 63 from pre-form 101, the pre-form 101 is folded about an axis x as shown in FIGS. 7 and 8. It will be appreciated that tube 121 will have a configuration that is suitable for such bending. It will be appreciated that heating element 100, thus formed, is of a general U-shaped configuration and has, particularly at the bottom end portion of the U-shape, a generally intensified heat emission when electric current is passed through wire 117. This results in a "hot-tip" heating element.

The cross section of tube 121 can take a variety of cross sectional shapes including half circles, triangles, rectangles, depending upon the desired configuration of the apertures to be formed in the panel 31. The cross sectional shape of the initial tube 121, will of course determine the cross sectional shape of the bent tube and thus heating element 100.

Figure 9:
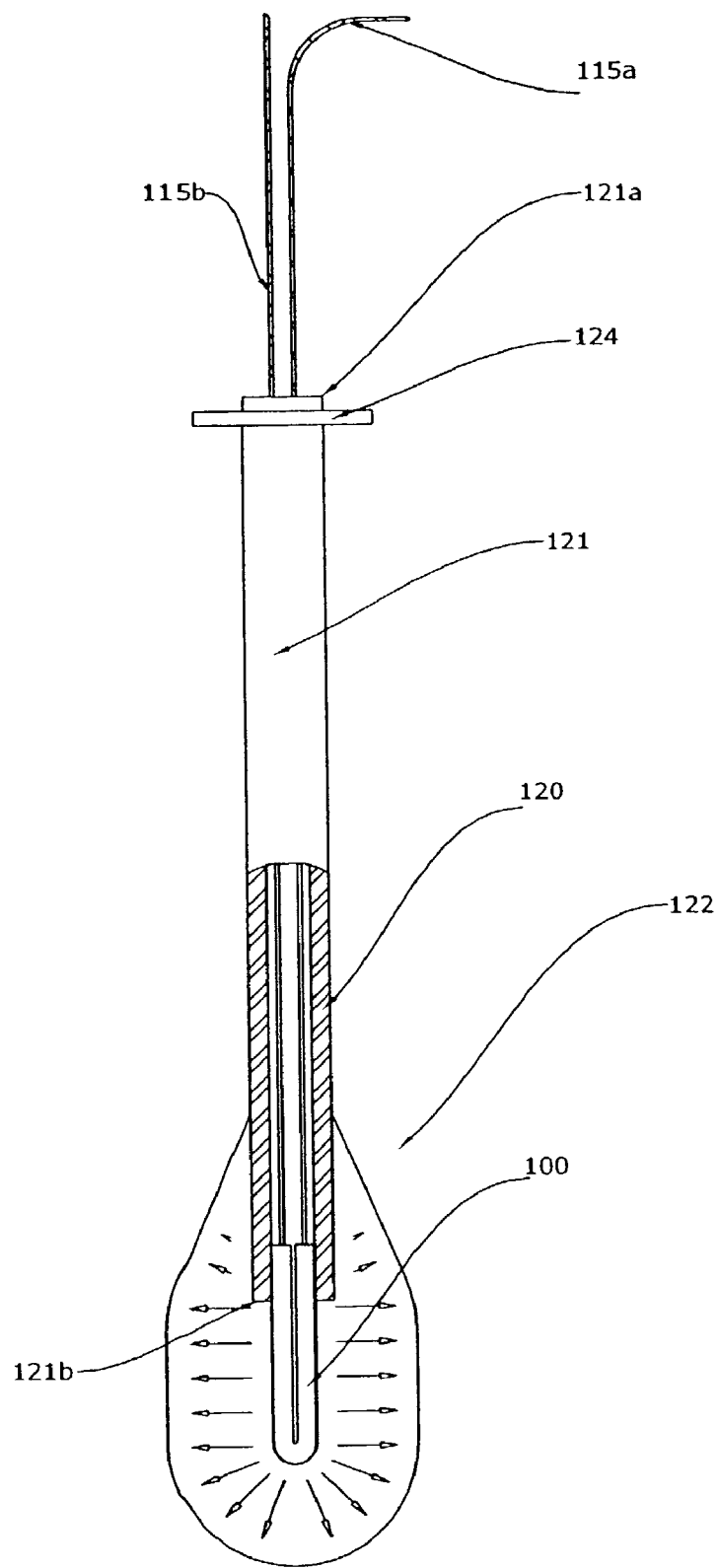
FIG. 9 is a front elevation view, partially cut away, of a heating cartridge employing the heating element of FIG. 8, and illustrating a preferred thermal heating field produced thereby.

With reference to FIG. 9, heating element 100 is shown housed in a holder 120 and thus forms a heating cartridge 122. Holder 120 comprises a hollow tube, in which is held heating element 100. Holder 120 is preferably made from stainless steel although other suitable materials can be used which include but are not limited to aluminum alloys.

Heating element 100 can be attached to holder 120 by, for example, spot welding. The upper end 120a of holder 120 is open to permit wires 115a, 115b to extend therefrom for connection to an electric circuit.

A flange member 124 is affixed (for example by spot welding) to holder 120 proximate upper end 121a of tube 121 and flange 124 assists in mounting the heating cartridge 122 to a beam member 83 as shown in FIG. 15. An aperture or bore in beam 83 permits cartridge 122 to be received there through and is suspended from the beam by the abutment of flange 124 with the upper surface of beam 83. Cartridge can be attached to beam 83 securely or preferably with a relatively easy mechanism for detaching the cartridge from its supporting beam. This allows easy-to-do repairs to be performed on the heating array. It will be appreciated that it is quite beneficial if the heating cartridges can be replaced easily if for example, a cartridge burns out.

In a preferred embodiment, cartridge 122 comprises generally a WATT-FLEX (trade mark) split-sheath cartridge heater made and sold by Dalton Heating Co., Inc. of Ipswich Mass., employing a heated tip. This cartridge design can supply an appropriate thermal field for each cartridge 122 of heating array 63.

It is preferred in cartridge 122 that a thermal field be provided that produces a thermal field which generally stretches ahead of the heating element 100, so that heating of a panel in a relatively narrow area can be achieved without the heating element having to contact the panel surface.

Figure 9A:
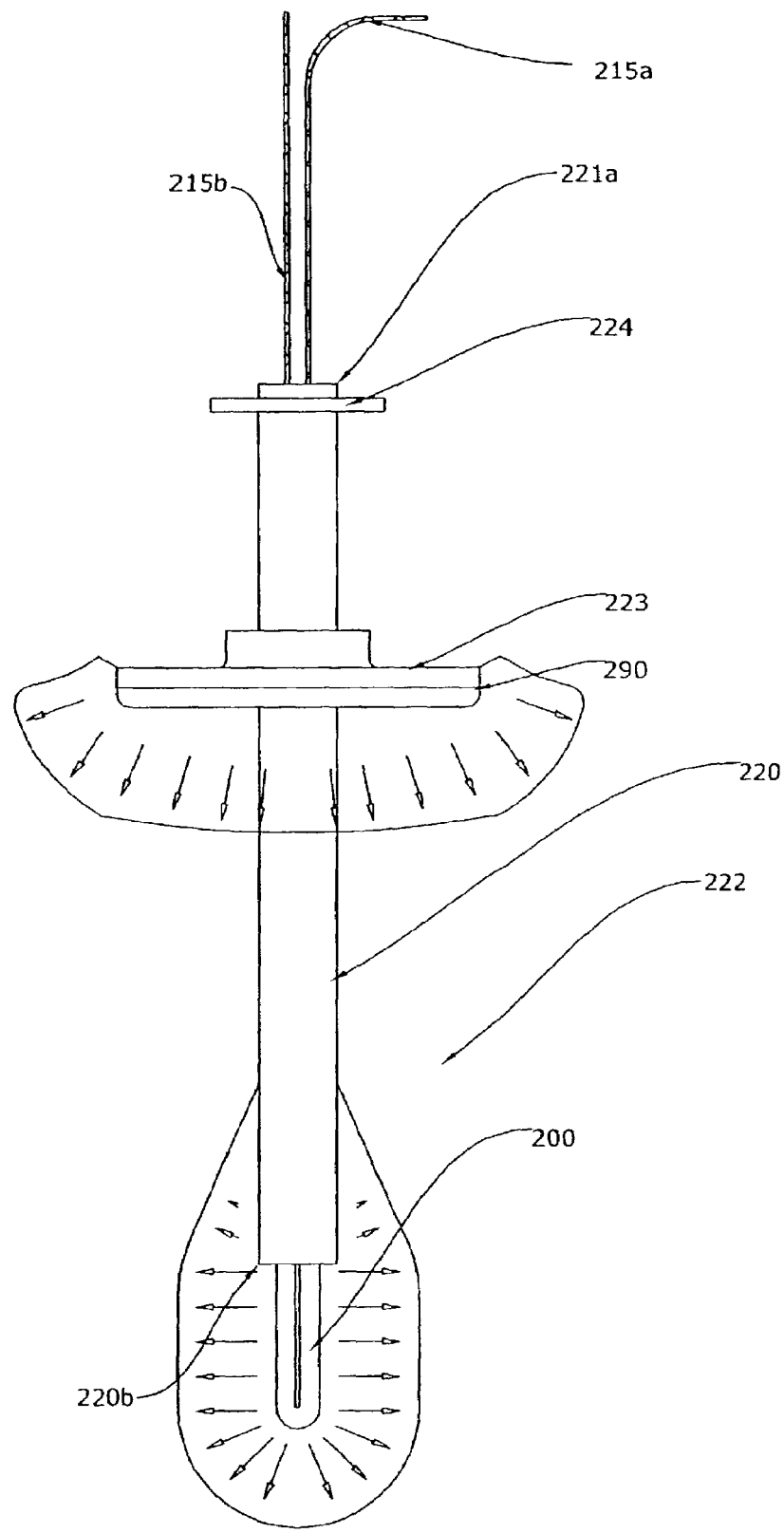
FIG. 9a is a front view of an alternate embodiment to the heating cartridge of FIG. 9, and illustrating a preferred thermal heating field produced thereby
Figure 10A:
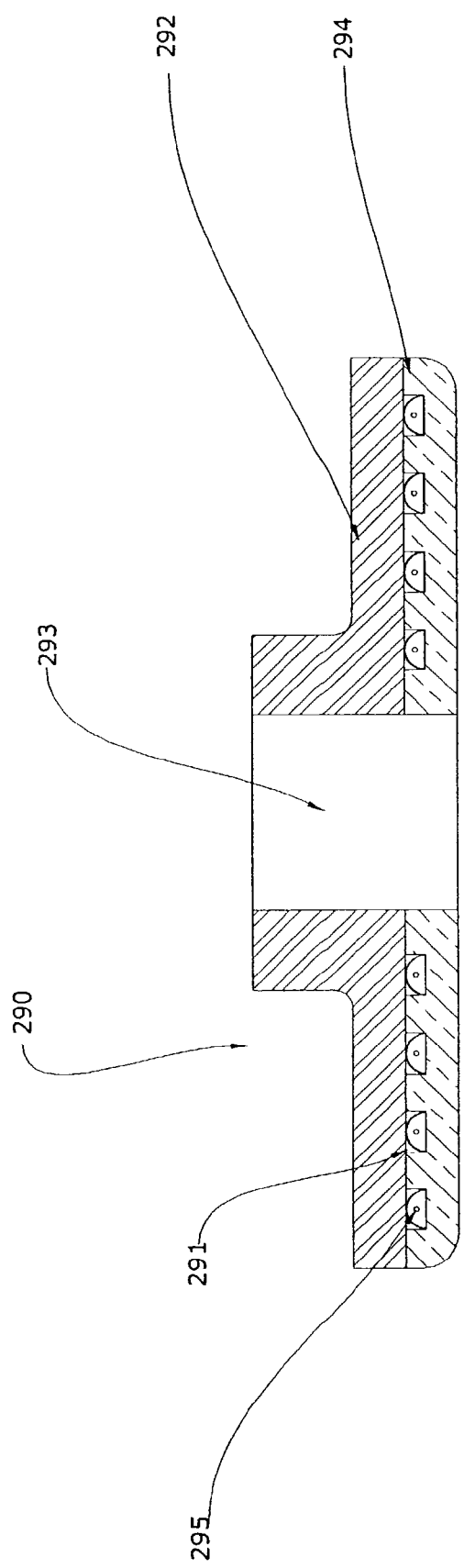
Figure 10B:
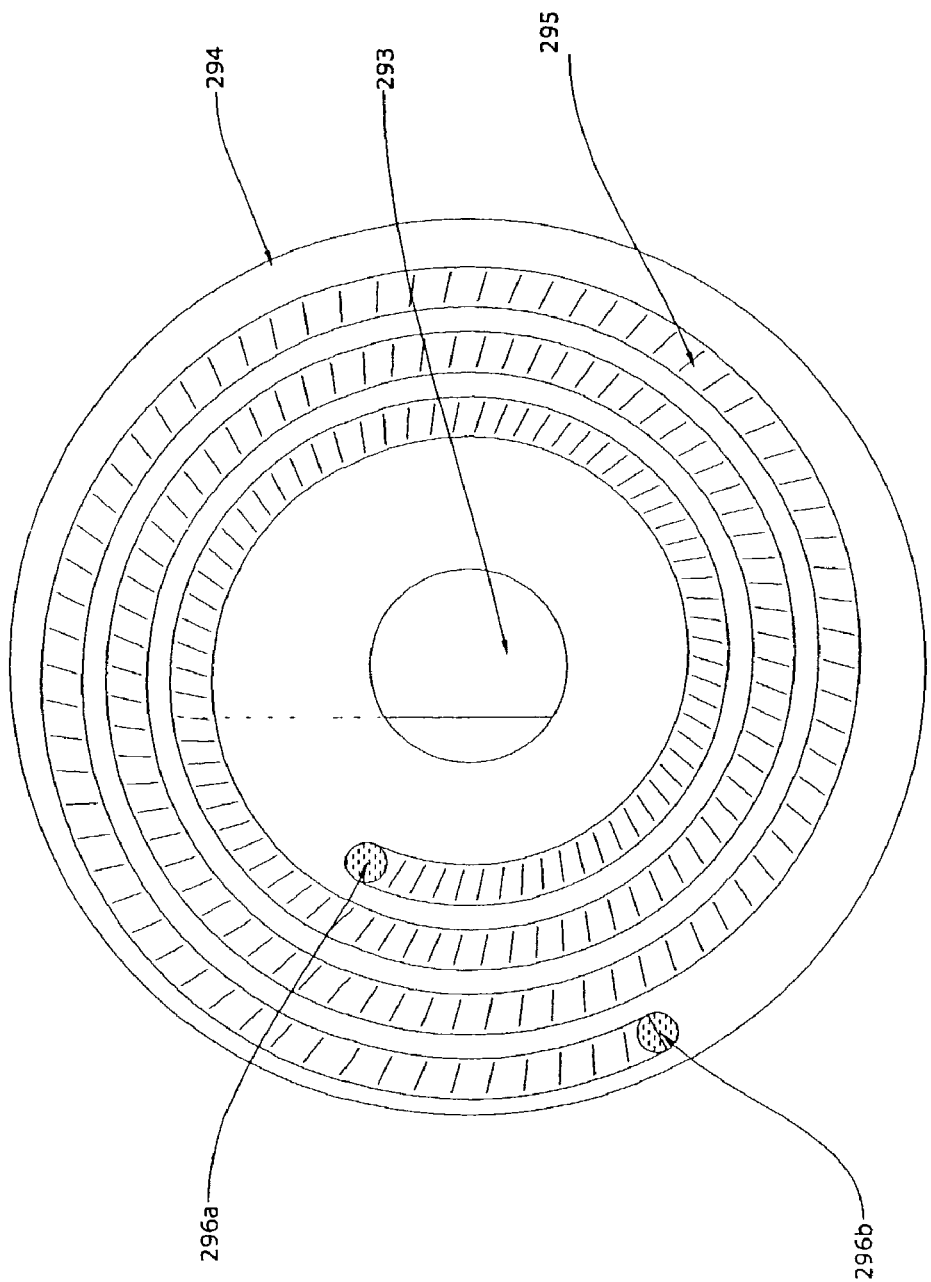
FIG. 10b is a plan view of disk heating element of FIG. 10a with removed top part.

With reference to FIGS. 9a and 10a, an alternate configuration for a heating cartridge is shown. Heating cartridge 222 employs a heating element 200 configured like heating element 100. Cartridge 222 also has a tube 221 configured generally like tube 121, with a flange 224 and wires 215a, 215b extending out from an upper end 221a thereof. In addition to heating element 200, cartridge 222 includes a secondary heating disc 290. As best shown in FIG. 10a, heating disc 290 essentially has three separate components: an upper cover member 292, a lower holder member 294 and wire member 295. Disc 290 also has a central bore 293 to permit the disc to be received onto tube 222, which is preferably affixed thereto by for example spot welding.

Cover 292 is made from a relatively a material with relatively high degree of thermal insulation (ie. low thermal conductivity), such as for example aluminum oxide ceramic. Other possible materials for cover 292 include but are not limited to sintered and compact barium oxide ceramic, nickel alloy. On the other hand holder 294, which is secured to cover 292, is made from a material with relatively high thermal conductivity such as a metal like copper or aluminum. Holder 294 is preferably affixed to cover 292 by common fasteners (screw or bolt and nut). It is thus preferred that holder 294 can be detached from cover 292 to make repairs and the like.

Formed in an upper surface of holder 294, is a continuous spiral groove 291 extending from a position near the outside perimeter of the disc, inward toward the center aperture 293. Inset in groove 291 is a continuous spiral wire cartridge 295 made from a material, such as nickel-chrome alloys having a relatively high electric resistance When electric current is run from an electric power source through cartridge 295 from contacts 296a to 296b (or in the reverse direction) heat is generated in the cartridge 295, which in turn heats holder 294. However, as cover 292 is made from a material with a relatively high degree of thermal insulation, the cover itself will not become unduly heated.

An example of a suitable heater that can be incorporated as a heating disc 290 is a DIFF-THERM (trade mark) Platen Heater also made and sold by Dalton Electric Heating Co., Inc.

It is important that the heating elements and disc be able to heat the panel up to, or above its melting temperature (which for expanded polystyrene is about 250 degrees C.) but that the temperature not reach or exceed the flash point of that material. In other words, it is important that the material not be heated to such a degree that it ignites.

Preferably the supply of electrical current to each of the cartridges 122 and to discs 190, is not by way of simply one or more transformers. Rather it is preferred that electronic devices (eg. teristor—triac with special IC) be associated with each cartridge. Each teristor (triac with special IC) can be provided with a specific duty cycle (eg. current on for 3 secs, current turned off for 2 secs, repeated). Alternatively, the teristor (triac with special IC) can be provided with a feedback look that is interconnected with temperature control device(s) [also provided]. In this way, the actual temperature of the heating elements can be monitored in real time and the teristor (triac with special IC) turned on and off as required. In this way, the supply of electric current to a particular cartridge can be turned off and on, to ensure that the temperature or thermal field emitted by the cartridge, stays within a desired range. This should have the effect of reducing the overall amount of electrical energy consumed by the machine 30.

One safety feature that can also be provided, is a mechanism for detecting if a particular cartridge has failed. This can be conveyed to an operator by way of a light emitting diode which is activated if there is a failure in the circuit. For example could be set up so that the diode will alternately be illuminated and then turn off during normal operation as the heat of the heating cartridge is maintained within a desired range, but will stay un-illuminated if the cartridge has failed.

Figure 17:
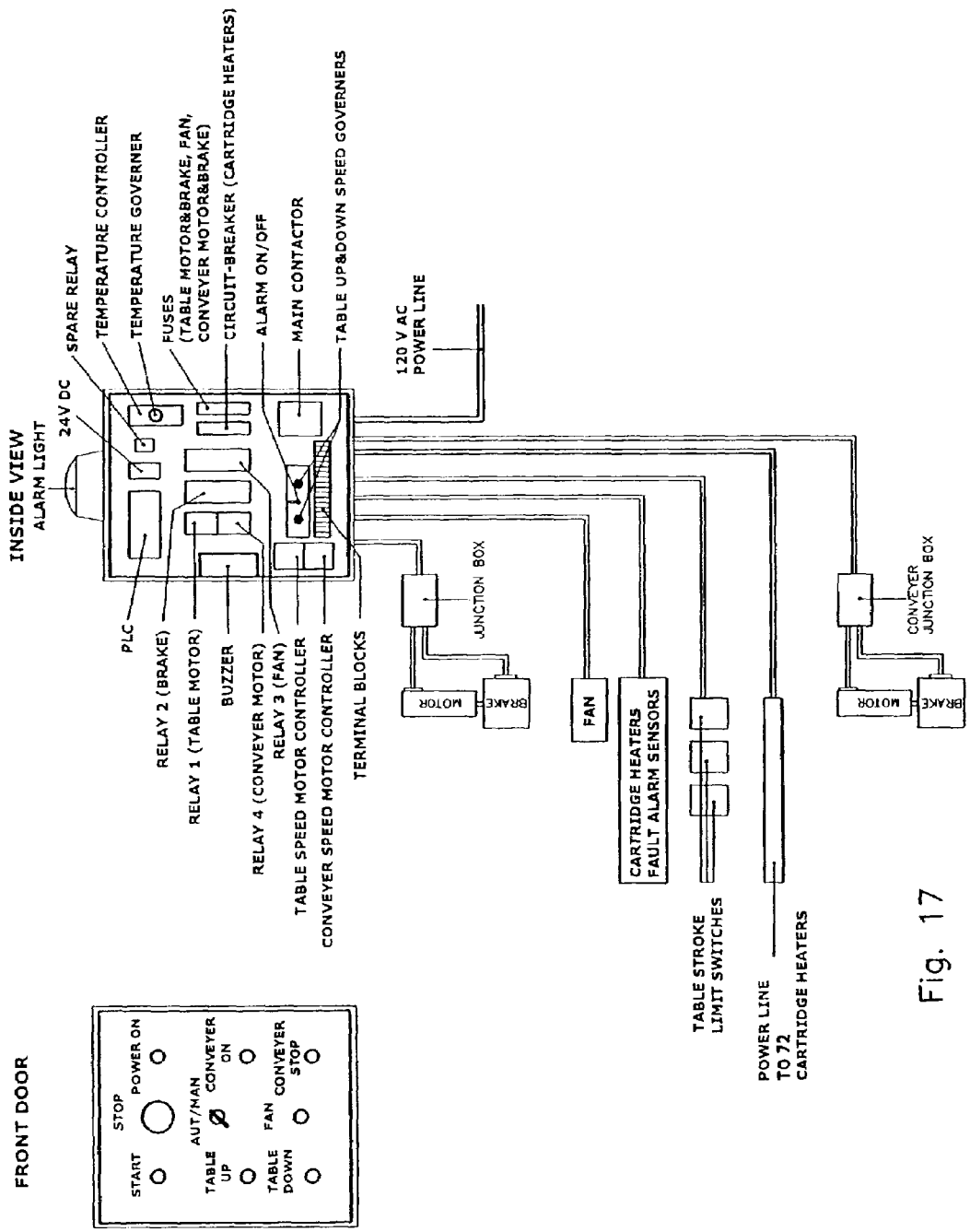
FIG. 17 is a schematic layout showing the control console for the machine of FIG. 1.

With reference to FIG. 17, an example layout for control console 61 (shown in FIGS. 1 and 2) is illustrated in detail.

Figure 18:
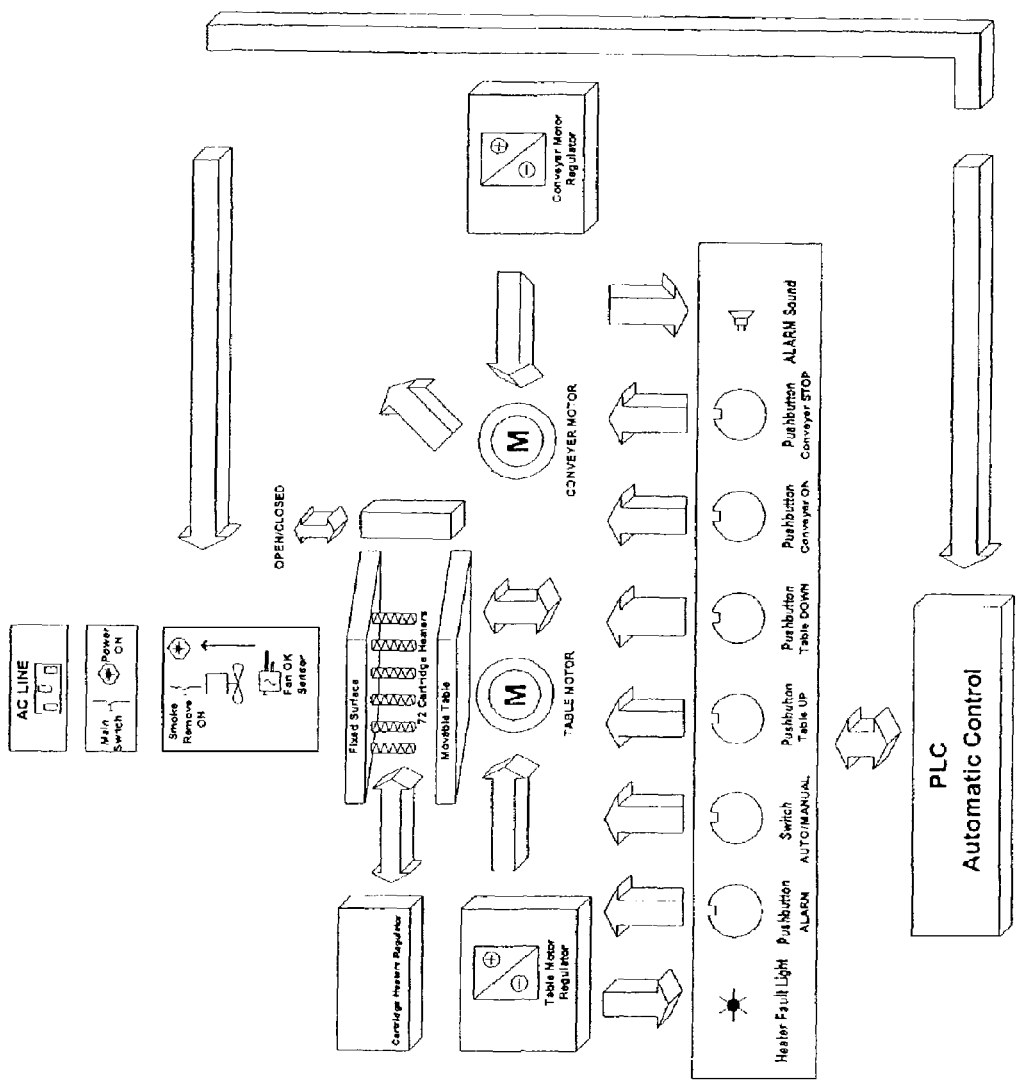
FIG. 18 is a schematic functional layout of several of the components of the machine of FIG. 1.

With reference to FIG. 18, an example schematic layout is shown of the operational features of machine 30.

In general the control system, which can operate in either a manual or automatic mode, performs a number of functions. The control system, including the PLC:

1. Provides for automatic temperature control for the heating cartridges and heating disc (if applicable), by controlling the supply of electricity to the heating elements therein.
2. Can control the movement of the panels on the conveyor 37 through stations, A, B and C.
3. Can operate the movement of the lift table up and down thus controlling the position of the panel in relation to the heating elements, including providing for intermittent motion during the aperture forming process caused by the heating elements.

4. Provides for machine shut-down or disablement in certain situations, particularly to ensure the safe operation of the machine 30.

The control system can also be used to automatically operate the transport conveyor 37, to deliver panels from station A, to B and to C.

Figure 11A:
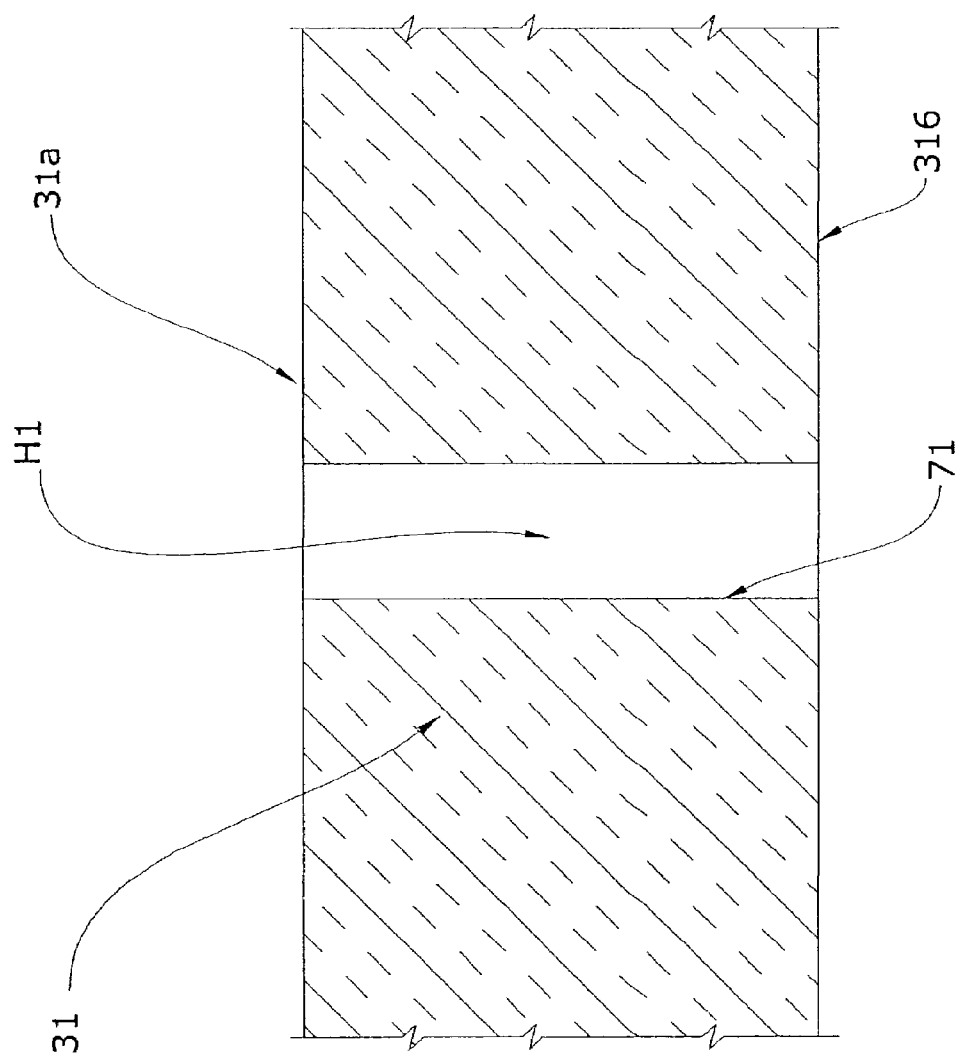
Figure 11B:
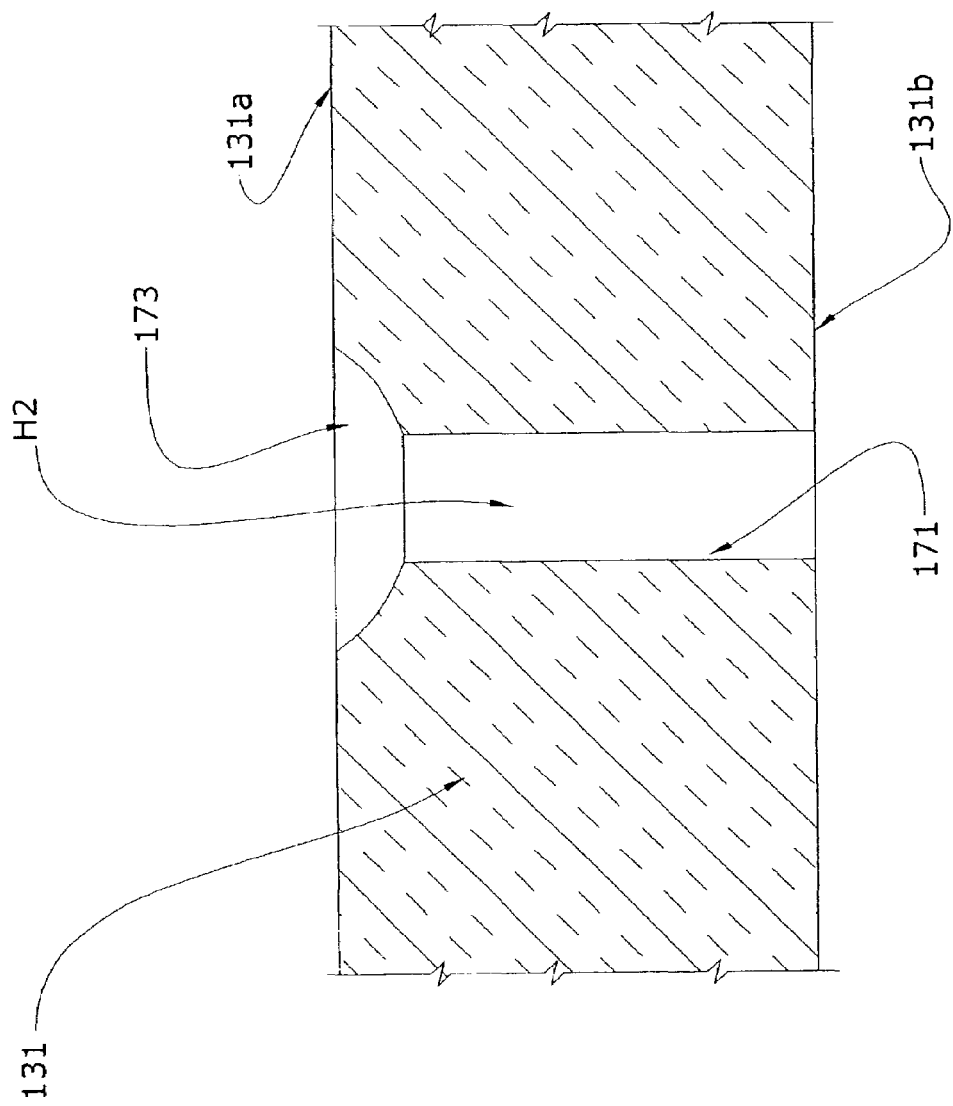
Figure 11C:
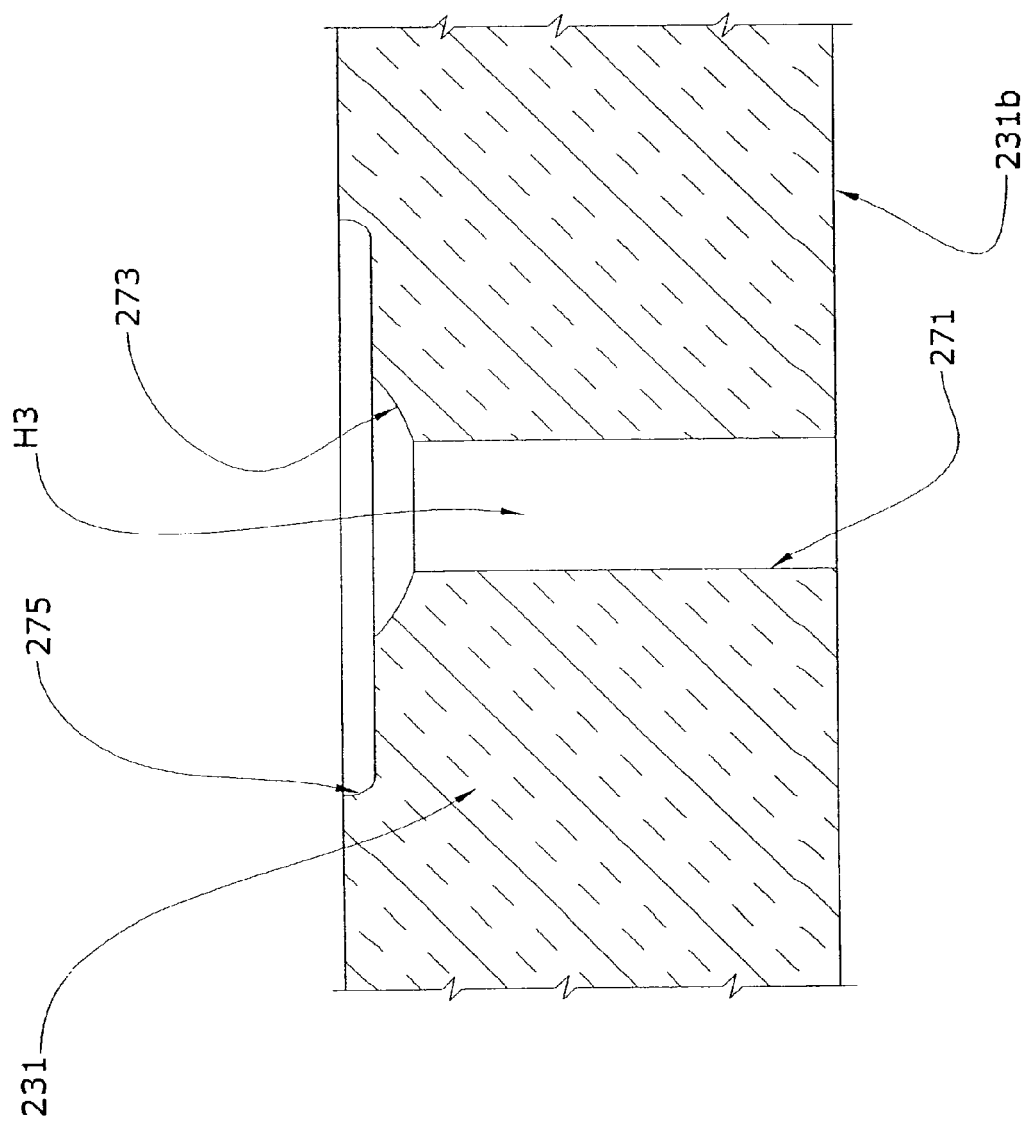

With reference to FIGS. 1a, 11b and 11c, three different shaped apertures H1, H2 and H3 respectively, are shown in a panel 31, as formed by machine 30.

With respect to FIG. 11a, aperture H1 is a straight forward cylindrical aperture extending from the upper surface 31a through the body of the panel to lower surface 31b and has cylindrical walls 71.

With respect to aperture H2 shown in FIG. 11b, this aperture has a cylindrical portion 171 like aperture H1 in FIG. 11a. However, extending downward for a short distance from upper surface 31a is a frustum of cone or sphere portion 173. Frustum of cone portion 173 provides an inset portion in the surface 131a of the panel that can be utilized for example to inset the leg of a connector element used to connect to a tie rod (not shown). Finally, with respect to FIG. 11c, aperture H3 in panel 231 comprises an aperture which is similar to aperture H2 in FIG. 11b but includes an additional cylindrical disc portion 275 positioned above frustum of cone portion 273 and cylindrical portion 271. Disk portion 275 has a much larger radius than cylinder portion 271 and cone portion 273 and can be utilized to provide an inset for a large mushroom-shaped connector nut or the like.

Figure 12A:
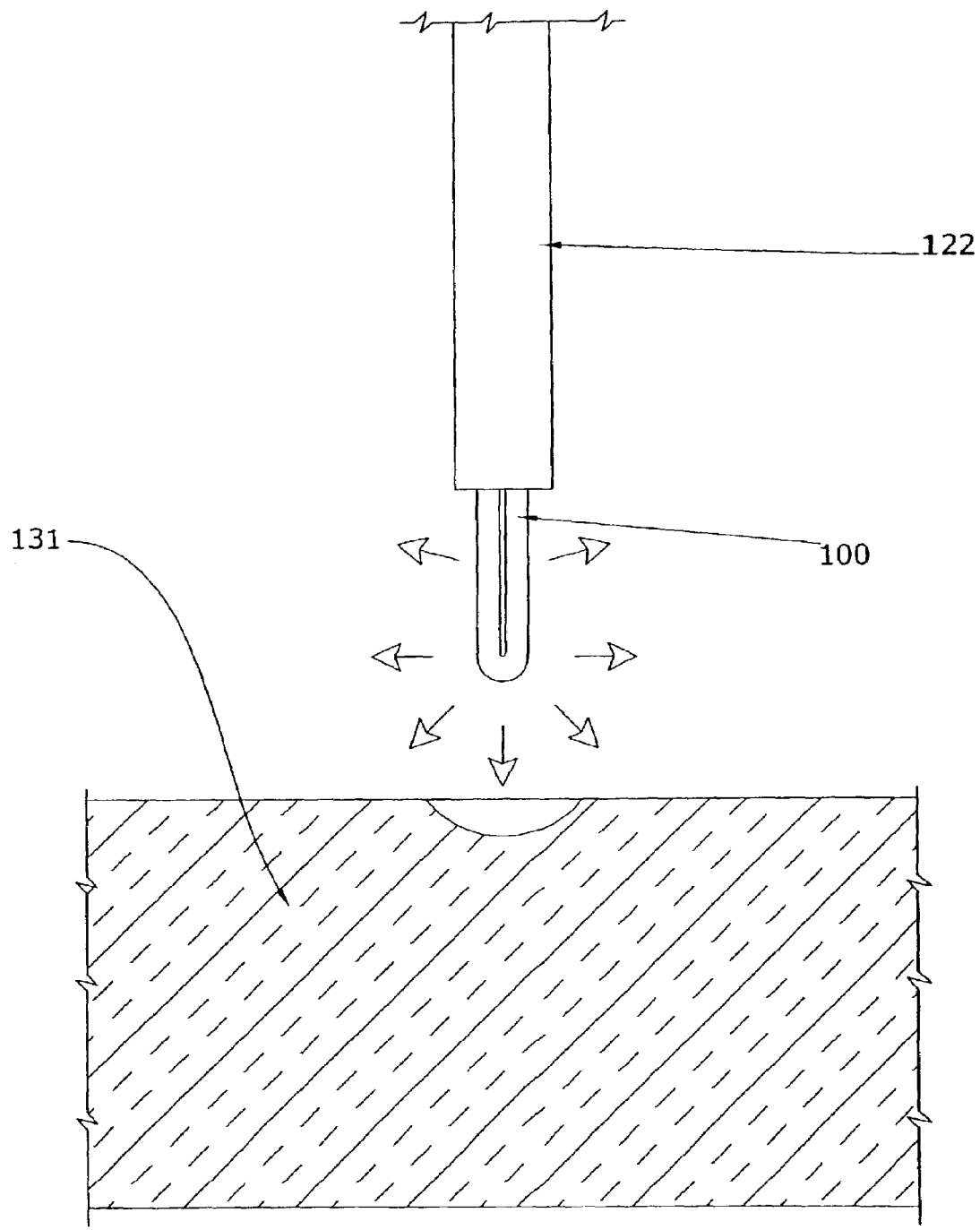
Figure 12B:
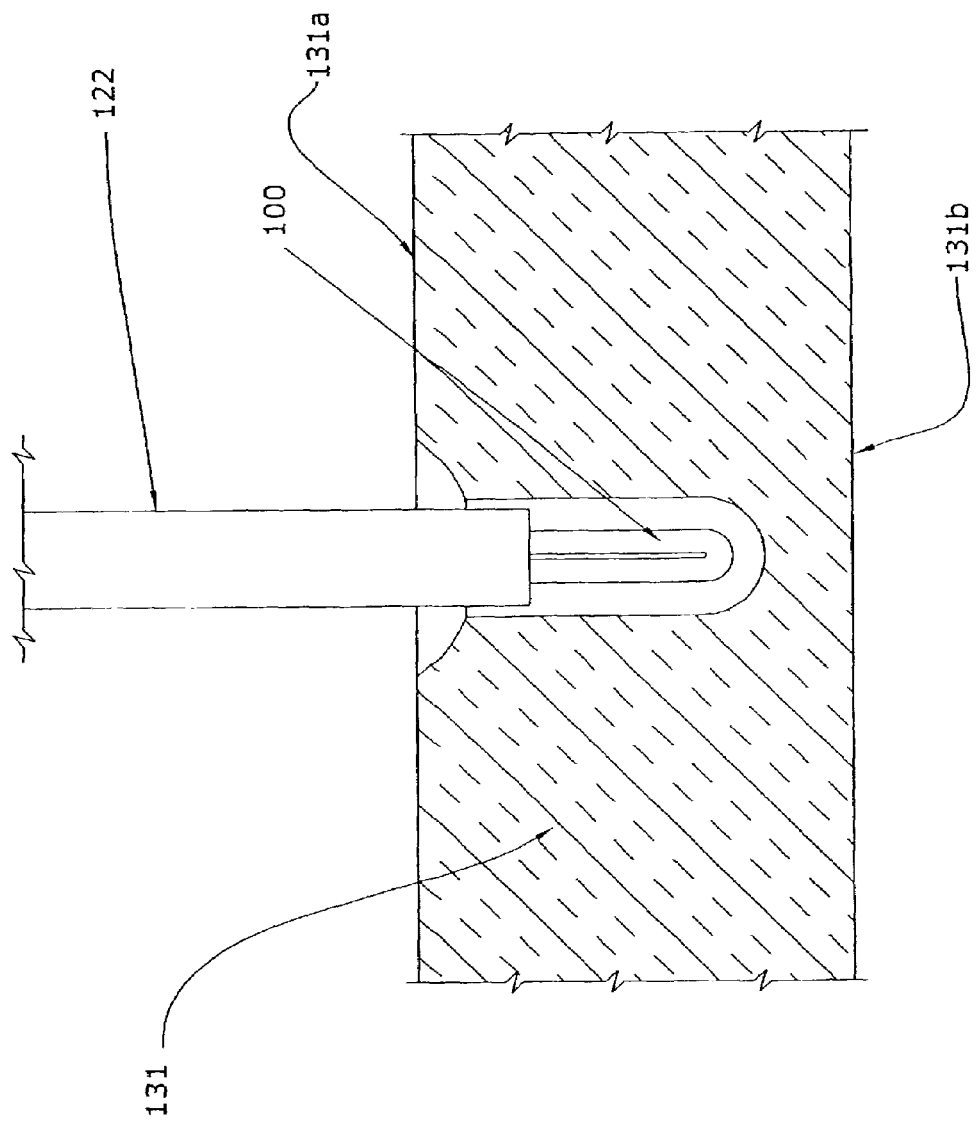

Now with reference to FIG. 12a, the formation of an aperture H1 in FIG. 11a is illustrated. When the lift table 41 is raised, the panel is brought gradually into the thermal field emitted from the element 100. As the temperature reaches the melting point of the polystyrene at the surface, the emitted heat start to melt the polystyrene sheet and start to form the aperture H1. If the element 100 is held at a fixed distance from panel 131 for an extended period of time, this will tend to cause the formation of the frustum of insert portion 173. Assuming that the thermal field around the bottom of the heating element is generally comprised of isotherms (akin to iso-lines—being positions in space having the same temperature) each formed to outline a semispherical shape, the opening 173 will tend to initially be formed in partial spherical shape as well. In a preferred embodiment, the tip of the heating element will be held approximately 0.5-2 cm from the upper surface of panel 31 for a time period in the range of 3-10 secs. Thereafter, as illustrated in FIG. 12b, as the panel is brought upwards the heating element 100, the element will pass into the body of the panel melting the polystyrene as it moves into the body and forming the cylindrical portion 171 of aperture H2. The formation of the cylindrical portion is assisted by the shape of the thermal field. Around the exposed body portion of heating element 100 the thermal field has cylindrical shaped or cylinder defining isotherm. Preferably, the rate of movement of panel 31 relative to the heating element 100 during the cylinder portion (171 in FIG. 11b) forming stage is in the range of 3-60 mm/sec.

It should be noted, that because the panel is moved relative to the environment, and the heating array 63 remains fixed relative to the environment, the disruption of the thermal field around each heating cartridge is minimized. This enable the desired shaped aperture in the panel to more easily form.

It will be appreciated that the particular shape and size of the aperture formed in the polystyrene sheet will be determined by features such as the amount of heat emitted from the heating element 100, the particular shape of the cross section of heating element 100 as well as the duration of the application of heat at any particular position in the vicinity of the polystyrene panel.

With reference to FIG. 12c, the use of secondary heating disk 290 on a cartridge 122 is illustrated to form a disk portion 275 in upper surface 231a of panel 231.

Generally, the operation of the machine is as follows. With reference again to FIGS. 1, 2 and 5 in particular, first a polystyrene sheet 31 is positioned on transport conveyor 37 between guides 81 and guides 83. This could be done manually or by a robot or other automated placement device. Conveyor 37 could be synchronized so that the loading at Station A of a panel 31 takes place at the same time as the other operations at Stations B and C as described hereinafter occur. In other words, loading, aperture forming and unloading can all take place while conveyor 37 is stationary, on three different panels 31.

Once panel 31 has been loaded at Station A, the conveyor is advanced to move panel 31 to Station B where it is positioned immediately above lift table 41 and the pusher elements 73 thereof. Then, either manually or by automation controlled by the PLC, the lift table will operate such that pushers 73 extend between conveyor belts to lift panel 31 upwards towards the heating array 63. In one embodiment, the lift table 41 will, as described above, stop for a period of time to permit a conical portion such as portion 173 in FIG. 11b and 12a to be formed. Thereafter, once the appropriate amount of melting of the polystyrene has occurred, the lift table is raised either manually or automatically such that movement upwardly of the polystyrene sheet initiates melting but is at such a speed that there is no contact directly between heating element 100 or in the other part of cartridge 122. Thus, the speed is controlled to ensure there is sufficient melting so that no contact occurs.

Once the heating element 100 has passed from the upper surface 131a to the lower surface 131b of the polystyrene sheet, it will be appreciated that there may be some dripping downwards of melted polystyrene material. However, because the heaters are below the heater ray 63, there is no dripping of material onto the heating elements 100 or any other part of heating array 63.

Once the aperture such as aperture H2 or H1 has been formed in the panel 31, the lift table is then lowered such that the sheet 31 is positioned back on conveyor 37 between guides 81 and 83. This preferably takes place relatively quickly so that no further melting of material occurs. Conveyor 37 can then be operated to move the sheet 37 to Station C where panel 31 is moved from machine 30 again either manually or automatically with a robot or the like.

When an aperture like H3 shown in FIG. 11c is desired, the movement of the cartridge 122 including heating element 100 and disk 290 is slightly varied. Once the panel has been pierced, and disk 290 is in a position above upper surface 231a (as shown in FIG. 12c), the lift table is stopped for a predetermined period of time to allow the formation of the disk portion 275 in surface 231a. The reverse movement through the panel to extract the cartridge 122 and heating element 100 is done at relatively high speed (preferably in the range of 50-150 mm/sec.) so that further melting and distortion of the opening is minimized.

Although preferred embodiments of the invention have been described in detail herein and illustrated in the drawings, it is to be understood that the invention is not limited to those precise embodiments and that various changes and modifications may be effected therein without departing from the scope or spirit of the invention.

I claim:

1. A method of forming a plurality of apertures in a rigid panel made from a meltable plastic material having a cellular structure with a plurality of cells filled at least in part with air, said panel having a length, a width and a depth, said apertures being formed through said depth, and said depth defining a panel body between opposed first and second surfaces, said method comprising:

moving said panel with said first and second surfaces oriented in a first orientation towards a plurality of heating elements in a first direction that is generally orthogonal to said first orientation, each of said heating elements having an elongated body portion formed in a generally U-shape with a rounded heating tip and being oriented about a longitudinal axis oriented in a second orientation that is generally parallel to said first direction, said heating elements each providing a thermal field around said body portion and around said tip, said heating elements not moving in relation to the environment, said panel moving toward and away from said heating elements without contacting said heating elements so that said first surface of said panel is heated by said plurality of heating elements to melt said plastic material at a plurality of locations without igniting the plastic material.

2. A method as claimed in claim 1 further comprising detecting if a heating element has failed and in response to said detecting of a failed heating element, activating a warning device.

3. A method as claimed in claim 1 further comprising monitoring the temperature of the heating elements.

4. A method as claimed in claim 3 further comprising in conjunction with the monitoring of the actual temperature of the heating elements, turning on and off an electrical current supply to said heating elements to control the actual temperature of said heating elements.

5. A method as claimed in claim 1 further comprising removing gases produced during the melting of said plastic material.

6. A method of forming a plurality of apertures in a rigid panel made from a meltable plastic material having a cellular structure with a plurality of cells filled at least in pan with air, said panel having a depth said apertures being formed through said depth, and said depth having an average depth of at least about 2 centimeters between first and second opposed surfaces defining a panel body there between, said method comprising:

a) moving said panel with said first surface oriented in a first orientation towards a plurality of heating elements in a first direction, elements, each of said heating elements having an elongated body portion formed in a generally U-shape to provide a generally curved heating tip and each of said heating elements having a longitudinal axis oriented in a second orientation generally orthogonal to said first orientation, said heating elements each providing a solid, longitudinally extending substantially stationary thermal field around said body and having in the vicinity of said tip, isotherms formed in generally semi-spherical shapes, said heating elements not moving in relation to the environment, each of said heating elements being adapted to emit sufficient heat to raise the plastic material above its melting temperature not to reach or exceed the flash point, so as to melt said plastic material within said thermal fields when said panel is positioned proximate said heating elements without igniting said plastic material, said panel moving in a direction that is generally parallel to said longitudinal axes of said bodies of said heating elements without contacting said heating elements so that said first surface of said panel is heated by said plurality of heating elements to melt said plastic material at a plurality of locations without igniting said plastic material.

7. A method as claimed in claim 6, performed using an apparatus comprising:

i. a movable panel supporting device for supporting said panel in said first orientation;

ii. a heating array comprising a plurality of heating elements mounted to a support frame, said heating array being disposed opposite to said panel supporting device; each of said heating elements being adapted to emit sufficient heat to melt said plastic material within said thermal field when said panel is positioned proximate said heating elements;

iii. a driving mechanism for moving said panel supporting device toward and away from said plurality of heating elements;

said apparatus operable to move said panel supporting device and a panel supported thereon, towards and away from the plurality of heating elements, wherein said plurality of heating elements are positioned opposite and proximate said first surface of said panel held by said supporting device, so that panel can be moved by said supporting device to a position proximate said plurality of heating elements enabling said heating elements to melt a plurality of apertures in said panel at said first surface of said panel.

8. A method as claimed in claim 7 wherein said panel is moved by said supporting device such that, due to the movement of said panel supporting device, said heating elements pass at least partially through said body of said panel to melt a plurality of apertures in said panel to form plurality of apertures that each extend from said first surface of said panel through said body to said second surface of said panel.

9. A method as claimed in claim 8 wherein while moving said panel said heating elements melt said plastic material when said panel is at a position that is separated from contact with said heating elements.

10. A method as claimed in claim 9 wherein said plastic material is expanded polystyrene.

11. A method as claimed in claim 7 wherein said panel supporting device comprises a plurality of spaced elongated pusher members oriented generally in said second orientation, each of said pusher members being offset in position from said heating elements and longitudinally oriented perpendicular to said second surface and each of said pusher members having an end for engaging said second surface of said panel, said heating array being mounted to a frame positioned spaced apart from said panel supporting device, and said panel supporting device is movable towards and away from said frame and said heating array.

12. A method as claimed in claim 11 wherein said supporting device is a lifting device having a drive mechanism that moves said lifting device towards, and away from, said heating array.

13. A method as claimed in claim 12 further comprising a controller device said controller controlling the movement and position of said lifting device relative to said heating array.

14. A method as claimed in claim 13 further comprising a transport conveyor operable to move said panel from a loading station to said lifting device, wherein said lifting device lifts said panel up from said transport conveyor toward said heating array, and thereafter moves said panel away from said heating array back on to said transport conveyor, said transport conveyor moving said panel away from said lifting device to an unloading station, and wherein said controller device also control the movement of said transport conveyor.

15. A method as claimed in claim 7 wherein each of said heating elements comprises:
   i. an outer tube having a hollow interior cavity and a first end and a second end;
   ii. a high resistance element extending in said cavity from proximate said first end to proximate said second end, said high resistance element being connected to a source for electricity to pass electric current through said high resistance element to thereby generate heal capable of melting said plastic material when said plastic material is proximate said heating element.

16. A method as claimed claim 15 further comprising a secondary heating element comprising a heating disc mounted to said outer tube at a distance from said tip, said heating disc making a disc shaped aperture at said first surface of said panel that is larger in width than the remaining portion of said aperture, to provide a surface recess.

17. A method as claimed in claim 16 further wherein said heating disc comprises a cover clement consist of a material with relatively low thermal conductivity and a holder affixed to said cover, said bolder made from a material of relatively high thermal conductivity, said holder housing a second high resistance heating element, said second high resistance heating element being connected to a source of electricity to pass electric current through said high resistance heating element to thereby generate heat and heat said holder to a temperature sufficient to melt said plastic material when said holder is positioned proximate said upper surface of said panel.

18. A method as claimed in claim 7 wherein each of said plurality of heating elements is powered by electric current.

19. A method as claimed in claim 18 further comprising electronic devices associated with each heating element which control the flow of electric current thereto.

20. A method as claimed in claim 7 wherein said plastic material is an expanded polystyrene.

21. A method as claimed in claim 7 wherein each of said tip provides a thermal field that define a semi-spherical shape in the vicinity of said hot tip medial portion.

22. A method as claimed in claim 7 further comprising a stripper mechanism for assisting in separating said panel and said heating elements after said heating elements have passed at least partially through said body of said panel to melt a plurality of apertures in said panel, said stripper mechanism comprising at least one bar member mounted for movement with said panel towards and away from said heating elements, said bar member engaging substantially only said first surface, said bar member moving with said panel when said panel is moved towards said heating elements, and said bar member exerting a force on said first surface tending to push said panel away from said heating elements, as said panel is moved away from said heating elements.

23. A method as claimed in claim 7 wherein while moving said panel, said heating elements melt said plastic material when said panel is at a position that is separated from contact with said heating elements.

24. A method as claimed in claim 6 further comprising the step of:
   (c) in association with step (a), after having moved said panel towards plurality of heating elements, holding said panel at a fixed position without contact with said heating elements for a period of time so as to farther melt said plastic material at said plurality of locations so as to provide a larger aperture opening portion in each of said plurality of apertures proximate said first surface of said panel, said opening portion leading to a remaining portion of said aperture that is smaller in width than said opening portion, and said opening portion and said remaining portion facilitating the inset of a connector element into said aperture.

25. A method as claimed in claim 24 wherein after forming said aperture, said heating elements and said panel are separated from each other by movement of said panel in an opposite direction to said first direction.

26. A method as claimed in claim 25 wherein said movement in said opposite direction is relatively fast compared to said movement in said first direction so as to minimize any additional melting of said plastic material as said heating elements and said panel are separated from each other.

27. A method as claimed in claim 24 further comprising the step of:
   (d) after step (c), continuing to move said panel towards said plurality of heat element such that at least a hot tip portion of each of said heating elements passes through said body from said first surface to said second surface as said plastic material in said body is melted to thereby form apertures through said body of said panel at a plurality of locations.

28. A method as claimed in claim 27 further comprising forming an enlarged disc shaped portion of said aperture at said opening portion using a secondary heating element.

29. A method as claimed in claim 24 wherein said upper surface of panel is held fixed beneath said plurality of heating elements for a period of time, to thereby form an opening portion of said aperture adjacent said upper surface, that has a width that is larger than a width of a remaining portion of said aperture said opening portion leading to a remaining portion of said aperture which is smaller in width than said opening portion, and said opening portion and said remaining portion facilitating the inset of a connector element into said aperture.

30. A method as claimed in claim 29 wherein said opening portion is generally formed in the shape of a truncated sphere.

31. A method as claimed in claim 24 wherein said plastic material is expanded or extruded polystyrene.

32. A method as claimed in claim 6 wherein each of said heating elements is formed with a longitudinally extending heated tube portion, said tube portion extending wit a first portion from a holder towards a hot tip medial portion that emits heat generally in the direction of a longitudinal axis of movement of said lifting device in front of said hot tip medial portion of said heating elements.

33. A method as claimed in claim 32 wherein said panel supporting device moves said panel relative to said heating elements so that said hot tip medial portion of each of said heating elements during melting of said plastic material passes said first surface of said panel, said body and beyond said second surface of said panel.

34. A method as claimed in claim 32 further comprising a transport conveyor, said method comprising moving said panel from a loading station to said lifting device, said lifting device lifting said panel from said transport conveyor towards said heating array, and thereafter moving said panel away from said heating array back on to said transport conveyor, said transport conveyor thereafter moving said panel away from said lifting device to an unloading station.

35. A method as claimed in claim 34 further comprising a lifting device which comprises a lifting frame having a plurality of upstanding pusher members positioned beneath said panel for engaging said second surface, said pusher members being mounted to said lifting frame, wherein when said lifting frame is moved towards said heating array, said pusher members move past said transport conveyor to lift and lower a panel carried on said transport conveyor.

36. A method as claimed in claim 6 further comprising an exhaust system that comprises an exhaust fan for forced extraction of gases.

37. A method as claimed in claim 36 further comprising a hood with an exhaust duct in communication with said exhaust fan, said hood positioned above said heating elements and configured to assist in directing said gases into said exhaust duct.

38. A method as claimed in claim 6 wherein each of said plurality of heating elements comprises:
  i. an outer tube having a hollow interior cavity and a first end and a second end, said first end having a hot tip;
  ii. a high resistance element extending in said cavity from proximate said first end to proximate said second end, said high resistance element being connected to a source for electricity to pass electric current through said high resistance element to thereby generate heat capable of melting a plastic material when said plastic material is proximate said heating element;
  iii. a heating disc mounted to said outer tube at a distance from said first end, said heating disc adapted to generate heat capable of melting said plastic material when said plastic material is proximate said heating disc.

39. A method as claimed in claim 6 wherein each of said heating elements comprises:
  i. an outer tube having a hollow interior cavity and a first end and a second end, said first end having a hot tip;
  ii. a high resistance element extending in said cavity from proximate said first end to proximate said second end, said high resistance element being connected to a source for electricity to pass electric current through said high resistance element to thereby generate heat capable of melting a plastic material when said plastic material is proximate said heating element;
  iii. a heating disc mounted to said outer tube at a distance from said first end, said heating disc adapted to generate heat capable of melting said plastic material when said plastic material is proximate said heating disc.

40. A method as claimed in claim 6 wherein each of said heating elements comprises:
  i. a heated longitudinally extending body providing a longitudinally extending thermal field around said body, said body having a first free end and a second end;
  ii. a heating disc mounted to said body at a distance from said first end of said body towards said second end, said heating disc adapted to generate a thermal field that extends transversely outward beyond said thermal field surrounding said body,
  said thermal fields of said body and said heating disc capable of melting a plastic material within said fields.

41. A method as claimed in claim 26 further comprising:
(c) in association with step (a), after having moved said panel towards said plurality of heating elements, holding said panel at a fixed position without contact with said heating elements for a period of time so as to further melt said plastic material at said plurality of locations.

42. A method as claimed in claim 6 further comprising removing gases produced during the melting of said plastic material.

* * * * *

UNITED STATES PATENT AND TRADEMARK OFFICE
CERTIFICATE OF CORRECTION

PATENT NO. : 7,238,312 B2  Page 1 of 1
APPLICATION NO. : 10/307855
DATED : July 3, 2007
INVENTOR(S) : Leonid G. Bravinski It is certified that error appears in the above-identified patent and that said Letters Patent is hereby corrected as shown below:

Column 11
Claim 6, line 45, replace "pan" with -- part --
Claim 6, line 53, replace "direction, elements, each of" with -- direction, each of --

Column 13
Claim 15, line 19, replace "heal" with -- heat --
Claim 17, line 29, replace "clement" with -- element --
Claim 17, line 31, replace "bolder with -- holder --

Column 14
Claim 24, line 6, replace "farther" with -- further --
Claim 32, line 54, replace "wit" with -- with --

Column 16
Claim 41, line 28, replace "claim 26" with -- claim 6 --

Signed and Sealed this

Twenty-ninth Day of January, 2008

JON W. DUDAS
*Director of the United States Patent and Trademark Office*